United States Patent [19]

Barbaresco

[11] Patent Number: 5,729,465
[45] Date of Patent: Mar. 17, 1998

[54] METHOD AND DEVICE TO DETERMINE THE FREQUENCY SPECTRUM OF A SIGNAL

[75] Inventor: Frédéric Barbaresco, Montgeron, France

[73] Assignee: Thomson-CSF, Paris, France

[21] Appl. No.: 661,790

[22] Filed: Jun. 13, 1996

[30] Foreign Application Priority Data

Jun. 13, 1995 [FR] France ................... 95 06983

[51] Int. Cl.⁶ .......................... G06F 19/00; G06F 17/10
[52] U.S. Cl. .................... 364/485; 364/498; 364/484; 364/571.02; 364/578; 342/192; 324/76.19
[58] Field of Search ........................ 364/485, 498, 364/571.01, 484, 571.02, 572, 578; 342/192; 324/76.19

[56] References Cited

PUBLICATIONS

IEEE Transactions on Ultrasonics, Ferroelectrics, and Frequency Control, vol. 42, No. 1, pp. 99–110, Jan. 1995, T. Baldeweck, et al., "Application of Autoregressive Special Analysis for Ultrasound Attenuation Estimation: Interest in Highly Attenuating Medium".

IEEE Transactions on Signal Processing, vol. 41, No. 3, pp. 1237–1247, Mar. 1993, William Campbell, et al., "Frequency Estimation Performance of Several Weighted Burg Algorithms".

IEEE Transactions on Signal Processing, vol. 40, No. 6, pp. 1518–1527, Jun. 1992, Joseph M. Pimbley, "Recursive Autoregressive Spectral Estimation by Minimization of the Free Energy".

(List continued on next page.)

*Primary Examiner*—Emanuel T. Voeltz
*Assistant Examiner*—Hien Vo
*Attorney, Agent, or Firm*—Oblon, Spivak, McClelland, Maier & Neustadt, P.C.

[57] ABSTRACT

The present invention pertains to the analysis of the frequency spectrum of a signal by a high-resolution method that is more precise than the Fourier transform when all that is available is a small number of samples of the signal. It pertains more particularly to a method for the autoregressive modelling frequency spectral analysis of a signal, known as Burg's maximum entropy method, and consists of a regularization of this method by means of a criterion similar to that already known to have been used in order to regularize the method of autoregressive spectral analysis known as the least error squares method, while at the same time keeping the advantages of Burg's maximum entropy method which are that it can be used in real time with a lattice type computation structure, that it can be extended to multisegment configurations and that it is robust with respect to computation noise, errors of quantization and rounding-off operations.

4 Claims, 3 Drawing Sheets

PUBLICATIONS

IEEE Transactions on Signal Processing, vol. 40, No. 1, pp. 249–252, Jan. 1992, Chi–Hsin Wu, et al., "Numerical Performances of Autoregressive Spectrum Estimators Based on Three–Term Recurrences".

IEEE Transactions on Signal Processing, vol. 39, No. 1, pp. 185–189, Jan. 1991, B.M. Bell, et al., "A Two Step Burg Algorithm".

Proceedings of the 23rd Asilomar Conference on Signals, Systems & Computers, vol. 2, pp. 1051–1055, Oct. 30–Nov. 1, 1989, J.M. Pimbley, et al., "Recursive Minimum Free Energy Spectral Estimation".

IEEE Transactions on Acoustics, Speech, and Signal Processing, vol. 38, No. 8, pp. 1437–1445, Aug. 1990, Hui–Min Zhang, et al., "An Improved Burg–Type Recursive Lattice Method for Autoregressive Spectral Analysis".

IEEE Transactions on Signal Processing, vol. 41, No. 1, pp. 403–407, Jan. 1993, S. Degerine, "Sample Partial Autocorrelation Function".

IEEE Transactions on Acoustics, Speech, and Signal Processing, vol. 38, No. 1, pp. 175–177, Jan. 1990, Dinh Tuan Pham, et al., "Efficient Computation of Autoregressive Estimates Through a Sufficient Statistic".

Proceedings of the 1990 International Conference on Acoustics, Speech, and Signal Processing, vol. 5, pp. 2523–2526, Apr. 3–6, 1990, T. Ning, et al., "Power Spectrum Estimation Via Orthogonal Transformation".

Proceedings of Electronicom 1985, vol. 3, pp. 614–617, Oct. 7–9, 1985, S.T. Nichols, et al., "A High Resolution Real Time Digital Spectrum Analyzer–Theory and Implementation".

Proceedings of IEEE International Conference on Acoustics, Speech, and Signal Processing, vol. 3, pp. 1345–1347, Mar. 26–29, 1985, P.F. Fougere, "Spectrum Model–Order Determination Via Significant Reflection Coefficients".

METHOD AND DEVICE TO DETERMINE THE FREQUENCY SPECTRUM OF A SIGNAL

BACKGROUND OF THE INVENTION

1. Field of the Invention

The present invention relates to the analysis of the frequency spectrum of a signal by a high resolution method that is more precise than the Fourier transform when all that is available is a small number of samples of the signal. It relates more particularly to a method for the autoregressive modelling analysis of the frequency spectrum of a signal by the method known as the Burg's maximum entropy method which has been the subject of articles, among them: [1] Burg J. P., "Maximum entropy spectral analysis", in Proc. 37th Annual Inter. Meeting Society of Exploration Geophysicists (Oklahoma City, Okla.), Oct. 31, 1967. This method can be used in a wide variety of fields, especially in radar for Doppler filtering and the detection of a rupture, namely an event that does not follow the modelling.

2. Description of the Prior Art

In the method of autoregressive modelling analysis a complex signal x(t) represented by a sequence of complex samples $\{x_n\}$ is modelled by means of a law of prediction that can be used to deduce the value of a sample $x_n$ from a linear combination of the values of the n–p preceding samples of the sequence. This entails searching for a relationship of forward prediction having the form:

$$x_n = \epsilon_{f,n,p} - \sum_{k=1}^{p} a_{p,k} \cdot x_{n-k} \tag{1}$$

where p is the order of the model, namely the number of previous samples of the sequence taken into account in the prediction, $\{a_{p,k}\}$ is a sequence of p complex coefficients defining the model and $\epsilon_{f,n,p}$ is a forward prediction error, by the p order model, of the sample $x_n$ which it should be possible to liken to a white noise if the model is faithful.

The modelling is said to be autoregressive because, when there is no noise and there are no errors of measurements on the samples, the higher the order p of the model, the more faithful is the modelling. In practice, the noises and measurement errors cause the modelling to diverge so that it is sought to limit the p order modelling to the lowest value for which the modelling error can be likened to a white noise.

The modelling can be used to obtain knowledge of the frequency spectrum of a regularly sampled signal x(t). Indeed, it is possible, from the relationship (1), to deduce the relationship:

$$\epsilon_{f,n,p} = \sum_{k=0}^{p} a_{p,k} \cdot x_{n-k} \tag{2}$$

with $a_{p,0}=1$ which by Fourier transform of its two members, becomes:

$$E_{f,n,p}(f) = \left( \sum_{k=0}^{p} a_{p,k} \cdot e^{-j2\pi k f} \right) X(f)$$

with:

$$\epsilon_{f,p,n}(t) \xrightarrow{TF} E_{f,p,n}(f)$$

$$x(t) \xrightarrow{TF} X(f)$$

We deduce therefrom:

$$|E_{f,p,n}(f)|^2 = \left| \sum_{k=0}^{p} a_{p,k} \cdot e^{-j2\pi k f} \right|^2 \times |X(f)|^2$$

Assuming that the model is reliable, namely that $\epsilon_{f,n,p}$ is a white noise, it can be assumed that:

$$|E_{f,n,p}(f)|^2 = P_{f,n,p}$$

where $P_{f,n,p}$ is the energy of the forward prediction error of the p order model for the sample $x_n$. The following is then got:

$$|X(f)|^2 = \frac{P_{f,n,p}}{\left| \sum_{k=0}^{p} a_{p,k} \cdot e^{-j2\pi k f} \right|^2}$$

which is the expression of the energy of the frequency spectrum of the sampled signal x(t) and which shows that this energy is deduced from the values of the sequence of the coefficients $\{a_{p,k}\}$ of the model.

The autoregressive model defined by the sequence of the coefficients $\{a_{p,k}\}$ of the law of forward prediction of the sample $x_n$ as a function of the n–p previous samples also has the property, which shall be used hereinafter, of corresponding to a law of backward prediction of the sample $x_{n-p}$ as a function of the following n–p. samples. For, we also have:

$$x_{n-p} = \epsilon_{b,n,p} - \sum_{k=1}^{p} a^{*}_{p,k} \cdot x_{n-p+k}$$

where * designates the conjugate operator and $\epsilon_{b,n,p}$ designates a error of backward prediction of the p order model on the value of the sample $x_{n-p}$.

The methods of autoregressive modelling spectral analysis raise the problem of determining the sequence of the complex coefficients $\{a_{p,k}\}$ defining the model adopted.

A known approach is that of the least error squares method which is based on a minimizing of the sum of the squares of the forward prediction errors $\epsilon_{f,n,p}$ for n varying from 0 to N–p+1, the samples $x_n$ being assumed to be zero beyond the interval [1, N]. According to the relationship (2), we have:

$$\sum_{n} |\epsilon_{f,n,p}|^2 = \sum_{n} \left| \sum_{k=0}^{p} a_{p,k} \cdot x_{n-k} \right|^2 \tag{3}$$

To minimize this sum of error squares, it is necessary to cancel its derivatives with respect to the sequence $\{a_{p,k}\}$ of the coefficients of the model. This is expressed by the system of linear equations:

$$\sum_{k=0}^{p} a_{p,k} \left( \sum_{n} x_{n-k} \cdot x^{*}_{n-j} \right) = 0 \quad \forall j \in [1, \ldots, p]$$

where again since $a_{p,0}$ is equal to one by definition:

$$\sum_n x_n \cdot x^*_{n-j} = -\sum_{k=1}^{p} a_{p,k} \left( \sum_n x_{n-k} \cdot x^*_{n-j} \right) \forall j \in [1, \ldots, p]$$

Assuming:

$$c_i = \sum_n x_n \cdot x^*_{n-i} \quad (4)$$

$$C_p = [c_1, \ldots, c_p]^T \quad (5)$$

$$A_p = [a_{p,1}, \ldots, a_{p,p}]^T \quad (6)$$

T being the transposition operator, and:

$$\Omega_p = \begin{bmatrix} c_0 & c^*_1 & \cdots & c^*_{p-1} \\ c_1 & c_0 & c^*_1 & \cdots & c^*_{p-2} \\ \cdot & \cdot & \cdot & & \cdot \\ \cdot & \cdot & \cdot & & \cdot \\ \cdot & \cdot & \cdot & & \cdot \\ c_{p-1} & c_{p-2} & & \cdots & c_0 \end{bmatrix}$$

it is possible to rewrite the system of equations in matrix form and arrive at the Yule-Walker equation:

$$\Omega_p A_p = -C_p \quad (7)$$

whence we deduce the value of the vector $A_p$ of the coefficients of the p order model:

$$A_p = -\Omega_p^{-1} C_p$$

−1 being the inversion operator.

It can be seen that the least error squares method necessitates an estimation of a p order autocorrelation matrix $\Omega_p$ and its inversion. This amounts to a large number of computations.

To reduce the number of computations, Levinson has sought a recursive formula on the order of the model. To do so, he has made use of the following operator:

$$V^{(-)} = J \cdot V^*$$

where J is the antidiagonal unit matrix. With this operator, the p order autocorrelation matrix $\Omega_p$ can be rewritten as a function of the p−1 order autocorrelation matrix $\Omega_{p-1}$ as follows:

$$\Omega_p = \begin{bmatrix} \Omega_{p-1} & C_{p-1}^{(-)} \\ C_{p-1}^{+} & c_0 \end{bmatrix}$$

where + is the transconjugate operator. Assigning the notation $A_p^m$ to the m first coefficients of the p order model, it is possible to write:

$$A_p = [A_p^{p-1}, a_{p,p}]$$

thus making it possible to put the Yule-Walker equation in the form:

$$\begin{bmatrix} \Omega_{p-1} & C_{p-1}^{(-)} \\ C_{p-1}^{+} & c_0 \end{bmatrix} \times \begin{bmatrix} A_p^{p-1} \\ a_{p,p} \end{bmatrix} = -\begin{bmatrix} C_{p-1} \\ c_p \end{bmatrix}$$

From this, a first matrix equation is derived:

$$\Omega_{p-1} A_p^{p-1} + a_{p,p} C_{p-1}^{(-)} = -C_{p-1}$$

This first matrix equation is transformed into:

$$A_p^{p-1} + a_{p,p} \Omega_{p-1}^{-1} \cdot C_{p-1}^{(-)} = -\Omega_{p-1}^{-1} \cdot C_{p-1}$$

Observing, according to the relationship (7) and the definition of the operator (−) that:

$$A_{p-1} = -\Omega_{p-1}^{-1} \cdot C_{p-1}$$

and that:

$$A_{p-1}^{(-)} = -\Omega_{p-1}^{-1} \cdot C_{p-1}^{(-)}$$

we get:

$$A_p^{p-1} = A_{p-1} + a_{p,p} A_{p-1}^{(-)}$$

Whence a recursive relationship on the coefficients of the models as a function of their order:

$$a_{p,k} = a_{p-1,k} + a_{p,p} \cdot a^*_{p-1,p-k}$$

which makes it possible to determine the coefficient of a p order model from the coefficients of the immediately lower p−1 order model, provided that the last coefficient $a_{p,p}$ has been determined beforehand and, therefore, provided that a structure of recursive computation is used on the order for the computations of all the coefficients of a model except for the last one. Unfortunately, the determining of the last coefficient $a_{p,p}$ is a difficult task for it makes use of the remaining equations of the system of Yule-Walker equations.

Burg's method of autoregressive modelling spectral analysis takes up Levinson's approach for determining the p−1 first coefficients of a p order prediction model. But it replaces the determining of the last coefficient $a_{p,p}$ by an estimation under a least error squares constraint using the sum of the energies of the forward and backward linear prediction errors. These energy values are given by:

$$\begin{cases} e_{f,n,p} = x_n + \sum_{k=1}^{p} a_{p,k} \cdot x_{n-k} \\ e_{b,n,p} = x_n + \sum_{k=1}^{p} a^*_{p,k} \cdot x_{n-p+k} \end{cases}$$

which, taking account of Levinson's recursive relationship:

$$a_{p,k} = a_{p-1,k} + \mu_p \cdot a^*_{p-1,p-k}$$

where $\mu_p$ is an estimation of the coefficient $a_{p,p}$ called a reflection coefficient, leads to the recursive relationships:

$$\begin{cases} e_{f,n,p+1} = e_{f,n,p} + \mu_{p+1} \cdot e_{b,n-1,p} \\ e_{b,n,p+1} = e_{b,n-1,p} + \mu^*_{p+1} \cdot e_{f,n,p} \end{cases} \quad n = p+2, \ldots, N \quad (8)$$

The mean of the sum of the error energy values is equal to:

$$P_{p+1} = \frac{1}{2}(P_{f,p+1} + P_{b,p+1}) =$$

$$\frac{1}{2(N-p+1)} \sum_{n=p+2}^{N} [|e_{f,n,p+1}|^2 + |e_{b,n,p+1}|^2]$$

The coefficient $\mu_{p+1}$ which minimizes this mean of the sum of energies is such that:

$$\frac{\delta P_{p+1}}{\delta \mu_{p+1}} = 0$$

which, by substituting the expressions of the forward and backward prediction errors at the order immediately below p in the formula of $P_{p+1}$, leads to the relationship:

$$\mu_{p+1} = \frac{-2 \sum_{n=p+2}^{N} e_{f,n,p} \cdot e^*_{b,n-1,p}}{\sum_{n=p+2}^{N} [|e_{f,n,p}|^2 + |e_{b,n-1,p}|^2]} \quad (9)$$

To compute the forward and backward prediction error terms in the numerator and denominator of the previous relationship (9) for defining a reflection coefficient, the relationships (8) are applied between the prediction errors bringing into play a recurrence on the order of the model starting with the sample of the signal $x_n$. This is done by means of a computer structure in the form of a lattice filter. In order to prevent the errors from diverging as the order position of the model increases, this lattice filter structure requires that the inverse filter should be stable. This means that the modulus of the reflection coefficient should be smaller than one.

The choice of a lattice structure of computer rather than a transversal structure has the threefold advantage of simplified hardware implementation, greater robustness with regard to truncation noises and greater robustness with regard to measurement noises.

A major application, in radar, of autoregressive model spectral analysis by Burg's maximum entropy method is in the discrimination of the spectral signal of clutter from the spectral signature of targets. This application requires the ability to compute the mean spatially on several range gates and several azimuths for the clutter is differentiated from the targets by a wide spatio-Doppler correlation. A segment of radar data elements is defined as a set of coherent recurrences in Doppler form coming from one and the same resolution cell of the radar. A spatial correlation of the data elements implies the use of data segments coming from resolution cells that are adjacent in distance and azimuth. The difficulty in the combination of these data segments lies in the temporal discontinuity between the different segments. Because of this discontinuity, samples cannot be simply recombined to give a single string of data elements taken as an input signal for Burg's algorithm. To resolve this problem, Haykin has proposed a multisegment version of Burg's algorithm in an article: [2] Haykin S., Currie B. W., Kesler S. B., "Maximum entropy spectral analysis of radar clutter", Proceedings of the IEEE, Vol. 70, No. 9, pp. 953–962, September 1982. This consists in modifying Burg's algorithm to define as many lattice filters as there are segments and, at each step, to define a common reflection coefficient computed to minimize the sum of the errors of each filter. Then, the procedure of estimation of the reflection coefficient is performed under a least error squares constraint on the mean of the energy values of the prediction errors on all the segments. The reflection coefficient is then reinjected into the different lattice structure filters. Let it be assumed that there are 1 disjointed segments of samples available for analysis:

$$\{x_n\}_i \text{ with } i = 1, \ldots, I \text{ and } N = \sum_{i=1}^{I} N_i$$

1 lattice filters are defined, having forward and backward linear prediction errors:

$$\begin{cases} e_{f,i,n,p+1} = e_{f,i,n,p} + \mu_{p+1} \cdot e_{b,i,n-1,p} \\ e_{b,i,n,p+1} = e_{b,i,n-1,p} + \mu^*_{p+1} \cdot e_{f,i,n,p} \end{cases}$$

with $n = p+2, p+3, \ldots, N_i$ and $i = 1, 2, \ldots, I$. The spatial-arithmetic mean of the sum of the energies of error on the 1 segments gives:

$$P_{I,p+1} = \frac{1}{I} \sum_{i=1}^{I} P_{i,p+1} =$$

$$\sum_{i=1}^{I} \frac{1}{2(N_i - p - 1)I} \sum_{n=p+2}^{N_i} [|e_{f,i,n,p+1}|^2 + |e_{b,i,n,p+1}|^2]$$

By substituting the expressions of the forward and backward prediction errors at the immediately lower order p in the above formula and by writing that the sought value of the reflection coefficient $\mu_{I,p+1}$ cancels the expression:

$$\frac{\delta P_{I,p+1}}{\delta \mu_{I,p+1}} = 0$$

we get:

$$\mu_{I,p+1} = \frac{-2 \sum_{i=1}^{I} \sum_{n=p+2}^{N_i} e_{f,i,n,p} \cdot e^*_{b,i,n-1,p}}{\sum_{i=1}^{I} \sum_{n=p+2}^{N_i} [|e_{f,i,n,p}|^2 + |e_{b,i,n-1,p}|^2]}$$

In an autoregressive model spectral analysis using Burg's maximum entropy method, as in the least error squares method, the choice of the order of prediction model is a crucial problem that has direct consequences for the resolution of the spectral analysis. A low order will deliver a smooth frequency spectrum erasing existing peaks while an excessively high order will induce spurious peaks in the frequency spectrum. Many statistical criteria have been proposed to estimate the optimum order at which it is preferable to stop:

- criteria based on the energy of the prediction error (Akaike's, Hannan's and Rissanen's criteria),
- criteria based on the whiteness of the residue (statistical coat-stand test, measurement of the flattening of the spectrum),
- criteria based on an optimization of a compromise between a bias term and a variance term.

These statistical criteria which are sometimes costly in terms of computations are limited to the case where the horizon of analysis is large. Indeed, they presuppose a normal distribution of the errors which, when it is not verified, especially in the case of a short horizon of analysis, makes the estimation underlying the order of the autoregressive model inconsistent.

In certain applications, such as those related to radar, the uncertainty as regards the determining of the order of the autoregressive model may be great owing to a horizon of observation that is extremely short.

To resolve this problem of estimation of the order of the prediction model of a method of autoregressive spectral analysis, Kitagawa and Gersch, in their articles,

[3] Kitagawa G., Gersch W., "A smoothness prior time-varying AR coefficient modelling of nonstationary covariance time series", IEEE Trans. AC-30, No. 1, pp. 48–56, January 1985.

[4] Kitagawa G., Gersch W., "A smoothness prior long AR model method for spectral estimation", IEEE Trans. AC-30, No. 1, pp. 57–65, January 1985, have proposed an approach within the framework of the least error squares method known as the regularized least error squares method. This approach consists in adding a regularizing function to the criteria of the least error squares, tending to dictate a smooth variation on the energy spectrum deduced from the coefficients of the prediction model in order to enable the maximum order of the model to be reached without allowing spurious peaks to develop in the energy spectrum. Instead of minimizing the simple criterion of the least error squares $J(A_p)$ whose expression resumed from the relationship (3) is:

$$J(A_p) = \sum_n \left| \sum_{k=0}^{p} a_{p,k} \cdot x_{n-k} \right|^2 \text{ with } A_p = [a_{p,1}, \ldots, a_{p,p}]^T$$

a criterion is minimized:

$$I(A_p) = J(A_p) + R(A_p)$$

where $R(A_p)$ is a regularizing function deduced from the transfer function $H_p(f)$ of the filter corresponding to the law of prediction of a p order model:

$$H_p(f) = \sum_{k=0}^{p} a_{p,k} e^{-j2\pi k f}$$

by means of the following relationship:

$$R(A_p) = \sum_k \lambda_k \cdot R_{p,k} \text{ with } R_{p,k} = \int_{-1/2}^{1/2} \left| \frac{d^k H_p(f)}{df^k} \right|^2 \cdot df$$

Taking only the first two orders, we get:

$$R(A_p) = \lambda_0 \int_{-1/2}^{1/2} |H_p(f)|^2 \cdot df + \lambda_1 \int_{-1/2}^{1/2} \left| \frac{dH_p(f)}{df} \right|^2 \cdot df$$

or again:

$$R(A_p) = \lambda_0 \sum_{k=0}^{p} a_{p,k}^2 + \lambda_1 (2\pi)^2 \sum_{k=1}^{p} k^2 a_{p,k}^2 = \sum_{k=0}^{p} [\lambda_0 + \lambda_1 (2\pi)^2 k^2] \cdot a_{p,k}^2$$

The least error squares method applied to this criterion $I(A_p)$ gives the coefficients $a_{p,k}$ of the p order model as the solution of the system of p linear equations:

$$\frac{dI(A_p)}{da_{p,j}} = \frac{dJ(A_p)}{da_{p,j}} + \frac{dR(A_p)}{da_{p,j}} = 0 \ \forall j \in [1, \ldots, p]$$

which can be put in the form:

$$\sum_{k=0}^{p} a_{p,k} \left( \sum_n x_{n-k} \cdot x^*_{n-j} \right) + 2(\lambda_0 + \lambda_1 \cdot (2\pi)^2 \cdot j^2) a_{p,j} = 0 \ \forall j \in [1, \ldots, p]$$

Assigning the notation D to the diagonal matrix defined by:

$$D = \text{Diag}\{[\lambda_0 + \lambda_1 \cdot (2\pi)^2 \cdot 1^2]^{\frac{1}{2}}, \ldots, [\lambda_0 + \lambda_1 \cdot (2\pi)^2 \cdot p^2]^{\frac{1}{2}}\}$$

and resuming the vector and matrix notations of the relationships (4, 5 and 6), it is possible to rewrite the system of equations giving the coefficients of the p order prediction model in the matrix form related to the Yule-Walker equation:

$$(\Omega_p + D^T.D) A_p = -C_p$$

Whence:

$$A_p = -(\Omega_p + D^T.D)^{-1}.C_p$$

It can be seen that the regularization is equivalent to adding regularization terms to the diagonal terms of the measured p order autocorrelation matrix $\Omega_p$, before inverting it. This addition makes it possible to give this positive autocorrelation matrix a semi-defined nature so as to make it preserve a physical character that it may have lost owing to errors of measurement.

To optimize the coefficients $\lambda_0$ and $\lambda_1$ in terms of maximum likelihood, it can be seen that the criteria of the regularized least error squares leads to the maximizing of the term:

$$\exp\left\{ -\frac{1}{2P_p} (J(A_p) + R(A_p)) \right\}$$

with an a posteriori law defined by the conditional distribution of the data elements:

$$f(x/A_p, P_p) = k_1 \exp\left\{ -\frac{1}{2P_p} [J(A_p)] \right\}$$

and an a priori law:

$$f(A_p/\lambda_0, \lambda_1, P_p) = k_2 \exp\left\{ -\frac{1}{2P_p} [R(A_p)] \right\}$$

The relationships being Gaussian, the likelihood of these parameters $\lambda_0$ and $\lambda_1$ is also Gaussian and is obtained by integration:

$$V(P_p, \lambda_0, \lambda_1/x) = \int f(x/A_p, P_p) . f(A_p/\lambda_0, \lambda_1, P_p) . dA_p$$

and the maximizing of $\text{Log}[V(P_p, \lambda_0, \lambda_1/x)]$ gives the optimum values of the coefficients $\lambda_0$ and $\lambda_1$.

These parameters $\lambda_0$ and $\lambda_1$ are chosen as a function of the type of application for a given measurement noise but are insensitive to errors of a factor of 10. For example, for an application involving the determination of a Doppler spectrum in radar technology, the parameter $\lambda_0$ may be taken to be a first order parameter and the parameter $\lambda_1$ may be taken to be a 0.001 order parameter.

The regularized least error squares method developed by Kitagawa and Gersch enables the choice of a high prediction model order with the constraint of spectral smoothness. However, it is not appropriate when the number of signal samples available is small. In this case, Burg's maximum entropy method is preferable for it is simpler to implement (with no matrix inversion but solely linear computations) and more robust in the face of computation noises and errors of quantization and rounding-off operations.

To regularize Burg's maximum entropy method, Silverstein and Pimbley have proposed a minimum free energy approach in the article:

[5] Silverstein S. D, Pimbley J. M. "The minimum free energy regularization connection: Linear-MFE", Marple Press, 23 ACSSC, pp. 365–370, 1989.

It has been seen earlier that the coefficients $a_{p,k}$ of a p order autoregressive prediction model and the coefficients $a_{p-1,k}$ of the immediately lower p–1 order autoregressive prediction model are related by Levinson's condition:

$$a_{p,k} = a_{p-1,k} + \mu_p \cdot a^*_{p-1,p-k} \quad \forall k \in [1, \ldots, p-1]$$

with:

$$a_{p,p} = \mu_p \text{ and } a_{j,0} = 1 \quad \forall j \in [1, \ldots, p]$$

For the transfer functions $H_p(p)$ and $H_{p-1}(f)$ of the predictive filters associated with the models:

$$H_p(f) = \sum_{k=0}^{p} a_{p,k} \cdot e^{-j2\pi kf}$$

$$H_p - 1(f) = \sum_{k=0}^{p-1} a_{p-1,k} \cdot e^{-j2\pi kf}$$

this leads to a recursive relationship having the form:

$$H_p(f) = H_{p-1}(f) + \mu_p \cdot e^{-j2\pi pf} \cdot H^*_{p-1}(f)$$

The idea is to modify the criterion minimized by Burg which is the mean of the forward and backward prediction error energies:

$$U_p = P_p = \frac{1}{2 \cdot (N-p)} \sum_{n=p+1}^{N} (|\epsilon_{f,n,p}|^2 + |\epsilon_{b,n,p}|^2)$$

by a corrective term $L_p$:

$$L_p = \int_{-1/2}^{1/2} \ln\left[\frac{P_p}{|H_p(f)|^2}\right] \cdot df$$

so that there is a new criterion to be minimized having the form:

$$E_p = U_p - \alpha L_p$$

called free energy by reference to a physical system for which $U_p$ would represent the energy, $L_p$ would represent entropy and $\alpha$ would represent the effective temperature. The choice of the reflection coefficient $\mu_p$ minimizing this new criterion is such that we have:

$$\frac{dE_p}{d\mu_p} = \frac{dU_p}{d\mu_p} - \alpha \frac{dL_p}{d\mu_p} = 0$$

which leads to the resolution of a third degree equation with real coefficients in $\gamma_p$ having the form:

$$(1-\gamma_p^2) \cdot (\gamma_p \cdot G_p + |D_p|) = -2\alpha\gamma_p \quad (10)$$

with $$\begin{cases} G_p = \frac{1}{N-p} \sum_{n=p+1}^{N} [|\epsilon_{f,n,p-1}|^2 + |\epsilon_{b,n-1,p-1}|^2] \\ D_p = \frac{2}{N-p} \sum_{n=p+1}^{N} \epsilon_{b,n-1,p-1} \cdot \epsilon^*_{f,n,p-1} \\ \mu_p = \frac{\gamma_p \cdot D_p}{|D_p|} \end{cases} \quad (11)$$

It can be seen that for $\alpha$ equals zero, Burg's classic solution is found again. Indeed, the polynomial then has three roots: $+1$, $-1$ and $-|D_p|/G_p$ so that there are three possible values for the reflection coefficient $\mu_p$ $$\mu_p = +\frac{D^*_p}{|D_p|}, -\frac{D^*_p}{|D_p|}, -\frac{D^*_p}{G_p}$$

Since it is desired that the modulus of $\mu_p$ should be strictly smaller than 1, only the last value is appropriate:

$$\mu_p = -\frac{D^*_p}{G_p}$$

Should $\alpha \neq 0$, it can be shown that there is only one approach giving a reflection coefficient whose modulus is strictly smaller than 1.

The regularizing of Burg's algorithm by the minimum free energy approach developed by Silverstein and Pimbley therefore consists in: computing the terms $D_p$ and $G_p$ on the basis of their definitions of the relationships (11), setting up the third degree equation in $\gamma_m$ of the relationship (10), computing the three roots of this equation, selecting the root $\gamma_{m0}$ whose modulus is strictly smaller than one, computing the reflection coefficient $\mu_p$ on the basis of the relationship:

$$\mu_p = \gamma_{m0} \frac{D^*_p}{|D_p|}$$

and computing the coefficients $a_{p,k}$ of the model by the usual recursive relationship:

$$a_{p,k} = a_{p-1,k} + \mu_p \cdot a^*_{p-1,p-k}$$

As compared with the non-regularized Burg's method, it requires an additional calculation consisting of a search for the roots of the third degree equation in $\gamma_m$.

The present invention is aimed at obtaining another method of regularizing Burg's method which is less restrictive from the computation point of view. For it has been seen that, had there not been this need for regularization, Burg's method as compared with the least errors squares method has a threefold advantage in that it can be implanted in real time at low computation cost, with a lattice structure, that it can be extended to the multisegment case introduced by Haykin for frequency filtering or for the temporal smoothing of spectral analysis and that it is robust with respect to computation noise, quantization errors and rounding-off operations.

SUMMARY OF THE INVENTION

An object of the present invention is a first method for determining the frequency spectrum of a sampled signal $\{x_n\}$ consisting in assessing the coefficients $\{a_{p,k}\}$ of a p order prediction model that correspond to a law of prediction of the nth sample $x_n$ from the n-p previous samples $\{x_{n-k}\}$, with k varying from 1 to p, having the form:

$$x_n = \epsilon_{f,n,p} - \sum_{k=1}^{p} a_{p,k} \cdot x_{n-k}$$

where $\epsilon_{f,n,p}$ is a forward prediction error, by the p order model, of the sample $x_n$, said coefficients $\{a_{p,k}\}$ giving an estimation of the energy of the frequency spectrum of the signal sampled in the form:

$$|X(f)|^2 = \frac{P_p}{\left|\sum_{k=0}^{p} a_{p,k} \cdot e^{-j2\pi k f}\right|^2}$$

where $a_{p,0}$ is equal to 1 and where $P_p$ is the energy of the forward prediction error of the p order model for the sample $x_n$ when the model is reliable, namely when said error is a white noise, on the basis of a recursive law on the p order of the model having the form:

$$a_{p,k} = a_{p-1,k} + \mu_p \cdot a^*_{p-1,p-k}$$

\* designating the conjugate operator, with:

$$a_{p,0} = 1$$

$$a_{p-1,0} = 1$$

$$k \in [1, \ldots p-1]$$

$\mu_p$ being a reflection coefficient determined from the terms:

$$\begin{cases} D_p = \frac{2}{N-p} \sum_{n=p+1}^{N} \epsilon_{b,n-1,p-1} \cdot \epsilon^*_{f,n,p-1} \\ G_p = \frac{1}{N-p} \sum_{n=p+1}^{N} [|\epsilon_{f,n,p-1}|^2 + |\epsilon_{b,n-1,p-1}|^2] \end{cases}$$

where $\epsilon_{f,n,p-1}$ designates the forward prediction error by the p-1 order prediction model on the sample $x_n$ and $\epsilon_{b,n-1,p-1}$ designates the backward prediction error by the p-1 order model on the sample $x_{n-p}$:

$$x_{n-p} = \epsilon_{b,n-1,p-1} - \sum_{k=1}^{p-1} a^*_{p-1,k} \cdot x_{n-p+k}$$

This method is noteworthy in that the reflection coefficient $\mu_p$ is determined by a relationship having the form:

$$\mu_p = -\frac{D^*_p + 2\sum_{k=1}^{p-1} [\lambda_0 + \lambda_1 \cdot (2\pi)^2 \cdot (k-p)^2] \cdot a_{p-1,k} \cdot a_{p-1,p-k}}{G_p + 2\sum_{k=0}^{p-1} [\lambda_0 + \lambda_1 \cdot (2\pi)^2 \cdot (k-p)^2] \cdot |a_{p-1,k}|^2}$$

where $\lambda_0$ and $\lambda_1$ are positive real coefficients.

An object of the invention is also a second method for determining the frequency spectrum of the mean of a family of 1 sampled signals $\{x_n\}_i$ consisting in assessing the coefficients $\{a_{p,k}\}$ of a p order prediction model that correspond to a law of prediction of an nth sample $x_{i,n}$ on the basis of the n-p previous samples $\{x_{i,n-k}\}$, k varying from 1 to p, having the form:

$$x_{i,n} = \epsilon_{f,i,n,p} - \sum_{k=1}^{p} a_{p,k} \cdot x_{i,n-k} \quad i \in [1, \ldots, I]$$

where $\epsilon_{f,i,n,p}$ is a forward prediction error, by the p order model, of the sample $x_{i,n}$ of the signal i, said coefficients $\{a_{p,k}\}$ giving an estimation of the mean of the energies of the frequency spectra of the sampled signals in the form:

$$|X(f)|^2 = \frac{P_{I,p}}{\left|\sum_{k=0}^{p} a_{p,k} \cdot e^{-j2\pi k f}\right|^2}$$

where $a_{p,0}$ is equal to 1 and where $P_{I,p}$ is the mean of the energies of the forward prediction errors of the p order model for the nth samples $x_{i,n}$ of the 1 signals when the model is reliable, namely when said errors are white noises, on the basis of a recursive law on the p order of the model having the form:

$$a_{p,k} = a_{p-1,k} + \mu_{I,p} \cdot a^*_{p-1,p-k}$$

\* designating the conjugate operator:
with:

$$a_{p,0} = 1$$

$$a_{p-1,0} = 1$$

$$k \in [1, \ldots p-1]$$

$\mu_p$ being a reflection coefficient determined on the basis of the terms:

$$\begin{cases} D_{I,p} = \frac{2}{(N-p)I} \sum_{i=1}^{I} \sum_{n=p+1}^{N} \epsilon_{b,i,n-1,p-1} \cdot \epsilon^*_{f,i,n,p-1} \\ G_{I,p} = \frac{1}{(N-p)I} \sum_{i=1}^{I} \sum_{n=p+1}^{N} [|\epsilon_{f,i,n,p-1}|^2 + |\epsilon^*_{b,i,n-1,p-1}|^2] \end{cases}$$

where $\epsilon_{f,n,p-1}$ designates the forward prediction error by the p-1 order prediction model on the nth sample of the $i^{th}$ signal and $\epsilon_{b,n-1,p-1}$ designates the backward prediction error, by the p-1 order model, on the n-$p^{th}$ sample of the $i^{th}$ signal:

$$x_{i,n-p} = \epsilon_{b,i,n-1,p-1} - \sum_{k=1}^{p-1} a^*_{p-1,k} \cdot x_{n-p+k}$$

This method is noteworthy in that the reflection coefficient $\mu_p$ is determined by a relationship having the form:

$$\mu_{I,p} = -\frac{D^*_{I,p} + 2\sum_{k=1}^{p-1} [\lambda_0 + \lambda_1 \cdot (2\pi)^2 \cdot (k-p)^2] \cdot a_{p-1,k} \cdot a_{p-1,p-k}}{G_{I,p} + 2\sum_{k=0}^{p-1} [\lambda_0 + \lambda_1 \cdot (2\pi)^2 \cdot (k-p)^2] \cdot |a_{p-1,k}|^2}$$

where $\lambda_0$ and $\lambda_1$ are positive real coefficients.

An object of the invention is also a device for implementing the first method referred to here above.

BRIEF DESCRIPTION OF THE DRAWINGS

Other features and advantages of the invention shall emerge from the following description of an embodiment given by way of an example. This description shall be made with reference to the drawings, wherein.

Figure 1:
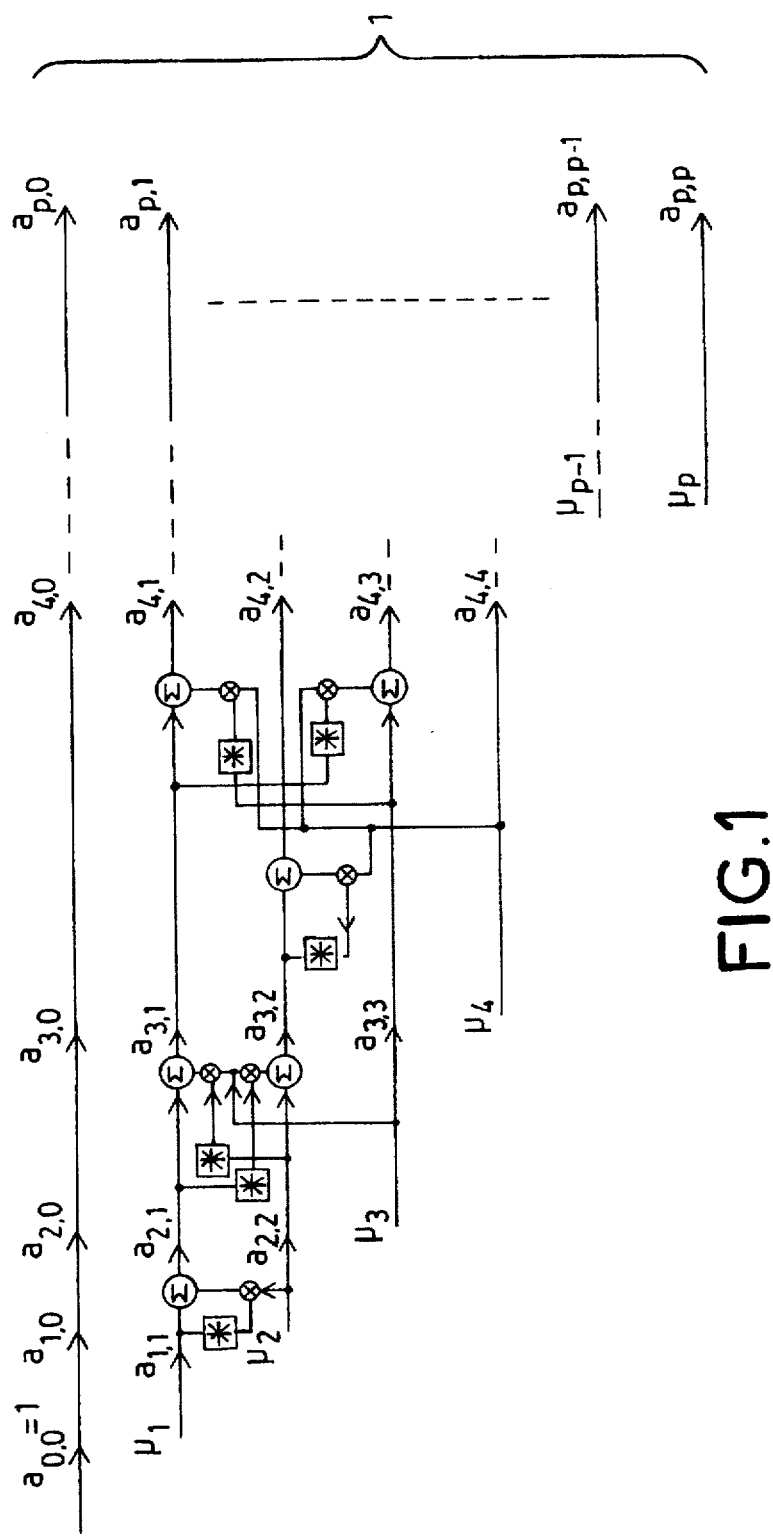
FIG. 1 shows a p order recursive computation circuit for the computation of the coefficients $\{a_{p,0}, \ldots, a_{p,p}\}$ of the prediction model as a function of the different coefficients of reflection $\{\mu_1, \ldots, \mu_p\}$ obtained by the Burg method.

As recalled here above, the spectral analysis of a sampled signal $\{x_n\}$ sampled by means of an autoregressive model using Burg's maximum entropy method consists in determining the coefficient $\{a_{p,1}, \ldots a_{p,p}\}$ of a p order prediction model that corresponds to a law of prediction of the nth sample $x_n$ on the basis of the n–p previous samples $\{x_{n-k}\}$, with k varying from 1 to p, having the form:

$$x_n = \epsilon_{f,n,p} - \sum_{k=1}^{p} a_{p,k} \cdot x_{n-k}$$

where $\epsilon_{f,n,p}$ is a positively oriented prediction error by the p order model, of the sample $x_n$ on the basis of a recursive law on the p order of the model having the form:

$$a_{p,k} = a_{p-1,k} + \mu_p \cdot a^*_{p-1,p-k} \quad (12)$$

designating the conjugate operator with:

$$\begin{cases} a_{p,0} = 1 \\ a_{p-1,0} = 1 \\ k \in [1, \ldots, p-1] \end{cases}$$

$\mu_p$ being a reflection coefficient determined on the basis of the relationship:

$$\mu_p = -\frac{D^*_p}{G_p} \quad (13)$$

with:

$$\begin{cases} D_p = \frac{2}{N-p} \sum_{n=p+1}^{N} \epsilon_{b,n-1,p-1} \cdot \epsilon^*_{f,n,p-1} \\ G_p = \frac{1}{N-p} \sum_{n=p+1}^{N} [|\epsilon_{f,n,p-1}|^2 + |\epsilon_{b,n-1,p-1}|^2] \end{cases} \quad (14)$$

where $\epsilon_{f,n,p-1}$ designates the forward prediction error, by the p–1 order prediction model, on the sample $x_n$ and $\epsilon_{b,n-1,p-1}$ the backward prediction error, by the p–1 order model, on the sample $x_{n-p}$:

$$x_{n-p} = \epsilon_{b,n-1,p-1} - \sum_{k=1}^{p-1} a^*_{p-1,k} \cdot x_{n-p+k}$$

This method of determining the reflection coefficient $\mu_p$ is equivalent to seeking a maximum entropy, namely the minimizing of the term:

$$E_p = U_p = \frac{1}{2(N-p)} \sum_{n=p+1}^{N} [|\epsilon_{f,n,p}|^2 + |\epsilon_{b,n,p}|^2] \quad (15)$$

The drawback of this method is that its reliability is highly sensitive to the choice of the order p of the prediction model: an excessively low order gives an estimation of the frequency spectrum that is far too rough and does not reproduce all the existing peaks while an excessively high order induces spurious peaks in this estimation of the frequency spectrum.

To make it possible to obtain a maximum order without allowing the development of spurious peaks in the estimation of the spectrum, it is proposed to add, to the criterion to be minimized, the regularization functions used by Kitagawa and Gersch in the framework of the spectral analysis by the least errors square method.

The criterion to be minimized becomes:

$$E_p = U_p + \sum_k \lambda_k \cdot R_{p,k}$$

wherein:

$$R_{p,k} = \int_{-1/2}^{1/2} \left| \frac{d^k H_p(f)}{df^k} \right|^2 \cdot df$$

where $H_p(f)$ is the transfer function of the predictive filter associated with the p order predictive model $$H_p(f) = \sum_{k=0}^{p} a_{p,k} \cdot e^{-j2\pi k f} \quad (16)$$

Hereinafter, the description shall be limited to a first order regularizing function namely, the criterion to be minimized that will be adopted will be the term:

$$E_p = U_p + \lambda_0 R_{p,0} + \lambda_1 R_{p,1}$$

The minimizing consists in cancelling the gradient of this term with reference to $\mu_p$:

$$\nabla_{\mu_p} E_p = \frac{\delta E_p}{\delta \mu_p} = 0 \quad (17)$$

which is also written as:

$$\nabla_{\mu_p} E_p = \nabla_{\mu_p} U_p + \lambda_0 \nabla_{\mu_p} R_{p,0} + \lambda_1 \nabla_{\mu_p} R_{p,1} = 0 \quad (18)$$

To explain this term, first of all the term $\nabla_{\mu_p} U_p$ is computed. According to the relationship (12) we have:

$$\nabla_{\mu_p} U_p = \frac{1}{2(N-p)} \sum_{n=p+1}^{N} \nabla_{\mu_p} |\epsilon_{f,n,p}|^2 + \nabla_{\mu_p} |\epsilon_{b,n,p}|^2$$

Taking account of the recursive relationship on the forward and backward prediction errors resulting from the recursive relationship (12) on the coefficients of the prediction model:

$$\begin{cases} \epsilon_{f,n,p} = \epsilon_{f,n,p-1} + \mu_p \epsilon_{b,n-1,p-1} \\ \epsilon_{b,n,p} = \epsilon_{b,n,p-1} + \mu^*_p \epsilon_{f,n,p-1} \end{cases}$$

and using the definition of the following complex derivation:

$$\nabla_{\mu_p} U_p = \frac{\delta U_p}{\delta Re[\mu_p]} + j \frac{\delta U_p}{\delta Im[\mu_p]}$$

it is shown that:

$$\begin{cases} \nabla_{\mu_p} |\epsilon_{f,n,p}|^2 = 2 \cdot \epsilon^*_{b,n-1,p-1} \cdot \epsilon_{f,n,p} \\ \nabla_{\mu_p} |\epsilon_{b,n,p}|^2 = 2 \cdot \epsilon_{f,n,p-1} \cdot \epsilon^*_{b,n,p} \end{cases}$$

We then obtain:

$$\nabla_{\mu_p} P_p = \mu_p \cdot G_p + D^*_p$$

with:

$$\begin{cases} D_p = \frac{2}{N-p} \sum_{n=p+1}^{N} \epsilon_{b,n-1,p-1} \cdot \epsilon^*_{f,n,p-1} \\ G_p = \frac{1}{N-p} \sum_{n=p+1}^{N} [|\epsilon_{f,n,p-1}|^2 + |\epsilon_{b,n-1,p-1}|^2] \end{cases}$$

We then go to the computation of $\nabla_{\mu_p} R_{p,0}$. By assumption, there is:

$$R_{p,0} = \int_{-1/2}^{1/2} |H_p(f)|^2 \cdot df \quad (19)$$

so that:

$$\nabla_{\mu_p} R_{p,0} = \int_{-1/2}^{1/2} \nabla_{\mu_p} |H_p(f)|^2 \cdot df$$

Owing to the recursive relationship (12) on the coefficients of the prediction model and their relationship of definition (16), there is also a recursive relationship between the transfer functions of the corresponding predictive filters as a function of the order. This relationship is as follows:

$$H_p(f) = H_{p-1}(f) + \mu_p \cdot e^{-j2\pi pf} \cdot H^*_{p-1}(f) \quad (20)$$

Taking account of the fact that:

$$|H_p(f)|^2 = H_p(f) \cdot H^*_p(f)$$

it is possible to write:

$$|H_p(f)|^2 = [H_{p-1}(f) + \mu_p \cdot e^{-j2\pi pf} \cdot H^*_{p-1}(f)] \cdot [H^*_{p-1}(f) + \mu^*_p \cdot e^{j2\pi pf} \cdot H_{p-1}(f)]$$

which can be put in the form:

$$|H_p(f)|^2 = (1+|\mu_p|^2) \cdot |H_{p-1}(f)|^2 + (\mu_p \cdot Y^*_p + \mu^*_p \cdot Y_p)$$

with:

$$Y_p = e^{j2\pi pf} \cdot H_{p-1}^2(f)$$

From this it is deduced that:

$$\nabla_{\mu_p} |H_p(f)|^2 = 2 \mu_p \cdot |H_{p-1}(f)|^2 + 2 e^{j2\pi pf} \cdot H_{p-1}^2(f)$$

Observing that:

$$\nabla_{\mu_p} H^*_p(f) = 2 e^{j2\pi pf} \cdot H_{p-1}(f)$$

a first relationship is obtained:

$$\nabla_{\mu_p} |H_p(f)|^2 = 2 \mu_p \cdot |H_{p-1}(f)|^2 + \nabla_{\mu_p} H^*_p(f) \cdot H_{p-1}(f) \quad (21)$$

This relationship can be used to make a trace back to the expression of the gradient of $R_{p,0}$. Indeed, by definition owing to the relationship (16), we have:

$$H_{p-1}(f) = \sum_{k=0}^{p-1} a_{p-1,k} \cdot e^{-j2\pi kf}$$

Taking account of the relationship (19) for the definition of the gradient $R_{p,0}$, the following is obtained by integration of the relationship (21):

$$\nabla_{\mu_p} R_{p,0} = 2 \cdot \mu_p \cdot \int_{-1/2}^{1/2} |H_{p-1}(f)|^2 \cdot df +$$

$$2 \cdot \sum_{k=0}^{p-1} \sum_{l=0}^{p-1} a_{p-1,k} \cdot a_{p-1,l} \cdot \int_{-1/2}^{1/2} e^{-j2\pi(k+l-p)f} \cdot df$$

Now:

$$\int_{-1/2}^{1/2} e^{-j2\pi(k+l-p)f} \cdot df = \delta_{k+l-p} \text{ (Kronecker symbol)}$$

and:

$$\int_{-1/2}^{1/2} |H_{p-1}(f)|^2 \cdot df = R_{p-1,0}$$

so that, from the above equation, the following relationship is deduced:

$$\nabla_{\mu_p} R_{p,0} = 2 \cdot \mu_p \cdot R_{p-1,0} + 2 \cdot \sum_{k=1}^{p-1} a_{p-1,k} \cdot a_{p-1,p-k} \quad (22)$$

The term $R_{p-1,0}$ may be developed as follows:

$$R_{p-1,0} = \int_{-1/2}^{1/2} |H_{p-1}(f)|^2 \cdot df = \int_{-1/2}^{1/2} H_{p-1}(f) \cdot H^*_{p-1}(f) \cdot df$$

again:

$$R_{p-1,0} = \sum_{k=0}^{p-1} \sum_{l=0}^{p-1} a_{p-1,k} \cdot a^*_{p-1,l} \cdot \int_{-1/2}^{1/2} e^{-j2\pi(k-l)f} \cdot df$$

Or:

$$\int_{-1/2}^{1/2} e^{-j2\pi(k-l)f} \cdot df = \delta_{k,l} \text{ (Kronecker symbol)}$$

whence:

$$R_{p-1,0} = \sum_{k=0}^{p-1} |a_{p-1,k}|^2 \quad (23)$$

Using the latter expression in the relationship (22) we obtain:

$$\nabla_{\mu_p} R_{p,0} = 2 \cdot \mu_p \cdot \sum_{k=0}^{p-1} |a_{p-1,k}|^2 + 2 \cdot \sum_{k=1}^{p-1} a_{p-1,k} \cdot a_{p-1,p-k} \quad (24)$$

To continue the development of the relationship (18), the following term still has to be computed:

$$\nabla_{\mu_p} R_{p,1} = \int_{-1/2}^{1/2} \nabla_{\mu_p} \left| \frac{dH_p(f)}{df} \right|^2 \cdot df \quad (25)$$

Owing to the recursive relationship (20) on the transfer function of the predictive filter associated with the model:

$$H_p(f) = H_{p-1}(f) + \mu_p \cdot e^{-j2\pi pf} \cdot H^*_{p-1}(f)$$

which can be noted as:

$$H_p(f) = H_{p-1}(f) + \mu_p \cdot T_p(f)$$

with:

$$T_p(f) = e^{-j2\pi f p} \cdot H^*_{p-1}(f) \quad (26)$$

it can be written that:

$$\left|\frac{dH_p(f)}{df}\right|^2 = \frac{dH_p(f)}{df} \cdot \left(\frac{dH_p(f)}{df}\right)^*$$

is also equal to:

$$\left|\frac{dH_p(f)}{df}\right|^2 = \left(\frac{dH_{p-1}(f)}{df} + \mu_p \cdot \frac{dT_p(f)}{df}\right) \cdot$$

$$\left(\left(\frac{dH_{p-1}(f)}{df}\right)^* + \mu^*_p \cdot \left(\frac{dT_p(f)}{df}\right)^*\right)$$

This is also written as:

$$\left|\frac{dH_p(f)}{df}\right|^2 = \left|\frac{dH_{p-1}(f)}{df}\right|^2 + |\mu_p|^2 \cdot$$

$$\left|\frac{dT_p(f)}{df}\right|^2 + \mu_p \cdot (M_p(f))^* + \mu^*_p \cdot M_p(f)$$

in assuming:

$$M_p(f) = \left(\frac{dT_p(f)}{df}\right)^* \cdot \frac{dH_{p-1}(f)}{df} \quad (27)$$

Passing to the gradient, we obtain:

$$\nabla_{\mu_p}\left|\frac{dH_p(f)}{df}\right|^2 = 2 \cdot \mu_p \cdot \left|\frac{dT_p(f)}{df}\right|^2 + 2 \cdot M_p(f) \quad (28)$$

To assess $M_p(f)$, it is observed that, according to the relationships of definition (27) and (26), we have:

$$M_p(f) = e^{j2\pi f p} \cdot \left(\frac{dH_{p-1}(f)}{df}\right)^2 + j2\pi p \cdot e^{j2\pi f p} \cdot \frac{dH_{p-1}(f)}{df} \cdot H_{p-1}(f)$$

To assesss:

$$\left|\frac{dT_p(f)}{df}\right|^2$$

it is observed that:

$$\left(\frac{dH^*_{p-1}(f)}{df}\right)^* = \frac{dH_{p-1}(f)}{df}$$

for:

$$H_{p-1}(f) = \sum_{k=0}^{p-1} a_{p-1,k} \cdot e^{-j2\pi f k}$$

so that it is possible to write:

$$\left|\frac{dT_p(f)}{df}\right|^2 =$$

$$(2\pi)^2 \cdot p^2 \cdot |H_{p-1}(f)|^2 + \left|\frac{dH_{p-1}(f)}{df}\right|^2 + Z_p(f) + Z^*_p(f)$$

with:

$$Z_p(f) = -j2\pi p \cdot H^*_{p-1}(f) \cdot \frac{dH_{p-1}(f)}{df}$$

To compute the expression (25), it is necessary to integrate each of the terms of the relationship (28). For the first term, there is obtained:

$$\int_{-1/2}^{1/2} M_p(f) = -(2\pi)^2 \cdot \sum_{k=0}^{p-1}\sum_{l=0}^{p-1} k \cdot$$

$$l \cdot a_{p-1,k} \cdot a_{p-1,l} \cdot \int_{-1/2}^{1/2} e^{-j2\pi(k+l-p)f} \cdot df +$$

$$(2\pi)^2 \cdot p \cdot \sum_{k=0}^{p-1}\sum_{l=0}^{p-1} l \cdot a_{p-1,k} \cdot a_{p-1,l} \cdot \int_{-1/2}^{1/2} e^{-j2\pi(k+l-p)f} \cdot df$$

which is equal to:

$$\int_{-1/2}^{1/2} M_p(f) \cdot df = (2\pi)^2 \cdot \sum_{k=1}^{p-1}(k-p)^2 \cdot a_{p-1,k} \cdot a_{p-1,p-k}$$

The integration of the other term of the relationship (28) gives:

$$\int_{-1/2}^{1/2} \left|\frac{dT_p(f)}{df}\right|^2 \cdot df = R_{p-1,1} + (2\pi)^2 \cdot p^2 \cdot R_{p-1,0} +$$

$$2Re\left[-(2\pi)^2 \cdot p \cdot \sum_{k=0}^{p-1}\sum_{l=0}^{p-1} k \cdot a_{p-1,k} \cdot a^*_{p-1,l} \cdot \delta_{k,l}\right]$$

which is also written as:

$$\int_{-1/2}^{1/2} \left|\frac{dT_p(f)}{df}\right|^2 \cdot df = R_{p-1,1} + (2\pi)^2 \cdot p^2 \cdot$$

$$R_{p-1,0} - 2 \cdot (2\pi)^2 \cdot \sum_{k=0}^{p-1} k \cdot p \cdot |a_{p-1,k}|^2$$

The synthetic expression of the gradient deduced therefrom:

$$\nabla_{\mu_p} R_{p,1} =$$

$$\left[R_{p-1,1} + (2\pi)^2 \cdot p^2 R_{p-1,0} - 2 \cdot (2\pi)^2 \cdot \sum_{k=0}^{p-1} k \cdot p \cdot |a_{p-1,k}|^2\right] +$$

$$2 \cdot (2\pi)^2 \cdot \sum_{k=1}^{p-1}(k-p)^2 \cdot a_{p-1,k} \cdot a_{p-1,p-k}$$

The terms $R_{p-1,0}$ and $R_{p-1,1}$ remain to be expressed. It has been seen, with the relationship (23) that:

$$R_{p-1,0} = \sum_{k=0}^{p-1} |a_{p-1,k}|^2$$

For the term $R_{p-1,1}$ the operation is started again from its definition:

$$R_{p-1,1} = \int_{-1/2}^{1/2} \left| \frac{dH_{p-1}(f)}{df} \right|^2 \cdot df$$

By explaining $H_{p-1}(f)$, the following is got:

$$R_{p-1,1} = (2\pi)^2 \cdot \sum_{k=0}^{p-1} \sum_{l=0}^{p-1} k \cdot l \cdot$$

$$a_{p-1,k} \cdot a^*_{p-1,l} \cdot \int_{-1/2}^{1/2} e^{-j2\pi(k-l)f} \cdot df$$

or again:

$$R_{p-1,1} = (2\pi)^2 \cdot \sum_{k=0}^{p-1} k^2 \cdot |a_{p-1,k}|^2$$

The gradient of $R_{p,1}$ then takes the form:

$$\nabla_{\mu_p} R_{p,1} = 2 \cdot \mu_p \cdot \left[ (2\pi)^2 \cdot \sum_{k=0}^{p-1} (k-p)^2 \cdot |a_{p-1,k}|^2 \right] +$$

$$2 \cdot (2\pi)^2 \cdot \sum_{k=1}^{p-1} (k-p)^2 \cdot a_{p-1,k} \cdot a_{p-1,p-k}$$

Whence the final expression of the energy gradient to be minimized as a function of the coefficients of the p−1 order prediction model and of the p order reflection coefficient:

$$\nabla_{\mu_p} E_p = \mu_p \cdot G_p + D^*_p + \lambda_0 \cdot$$

$$\left[ 2 \cdot \mu_p \cdot \sum_{k=0}^{p-1} |a_{p-1,k}|^2 + 2 \cdot \sum_{k=1}^{p-1} a_{p-1,k} \cdot a_{p-1,p-k} \right] + \lambda_1 \cdot$$

$$\left[ 2 \cdot \mu_p \cdot \left( (2\pi)^2 \cdot \sum_{k=0}^{p-1} (k-p)^2 \cdot |a_{p-1,k}|^2 \right) + \right.$$

$$\left. 2 \cdot (2\pi)^2 \cdot \sum_{k=1}^{p-1} (k-p)^2 \cdot a_{p-1,k} \cdot a_{p-1,p-k} \right]$$

Returning to the relationship (17) which expresses the fact that a reflection coefficient $\mu_p$ is sought such that:

$$\nabla_{\mu_p} E_p = 0$$

a new expression of the reflection coefficient of the regularized Burg's spectral analysis is deduced therefrom:

$$\mu_p = -\frac{\frac{2}{N-p} \sum_{n=p+1}^{N} \epsilon_{f,n,p-1} \cdot \epsilon^*_{b,n-1,p-1} + 2 \cdot \sum_{k=1}^{p-1} [\lambda_0 + \lambda_1 \cdot (2\pi)^2 \cdot (k-p)^2] \cdot a_{p-1,k} \cdot a_{p-1,p-k}}{\frac{1}{N-p} \sum_{k=p+1}^{N} \left[ |\epsilon_{f,n,p-1}|^2 + |\epsilon_{b,n-1,p-1}|^2 \right] + 2 \cdot \sum_{k=0}^{p-1} [\lambda_0 + \lambda_1 \cdot (2\pi)^2 \cdot (k-p)^2] \cdot |a_{p-1,k}|^2} \quad (29)$$

which can be written in abridged form:

$$\mu_p = -\frac{D^*_p + 2 \sum_{k=1}^{p-1} [\lambda_0 + \lambda_1 \cdot (2\pi)^2 \cdot (k-p)^2] \cdot a_{p-1,k} \cdot a_{p-1,p-k}}{G_p + 2 \sum_{k=0}^{p-1} [\lambda_0 + \lambda_1 \cdot (2\pi)^2 \cdot (k-p)^2] \cdot |a_{p-1,k}|^2}$$

with the definitions of the previous relationships (14):

$$\begin{cases} D_p = \frac{2}{N-p} \sum_{n=p+1}^{N} \epsilon_{b,n-1,p-1} \cdot \epsilon^*_{f,n,p-1} \\ G_p = \frac{1}{N-p} \sum_{n=p+1}^{N} [|\epsilon_{f,n,p-1}|^2 + |\epsilon_{b,n-1,p-1}|^2] \end{cases}$$

It is noted that the regularization consists in modifying the definition in the form of a fraction of the reflection coefficient:

$$\mu_p = -\frac{D^*_p}{G_p}$$

of Burg's spectral analysis method by adding the following expression to the numerator:

$$2 \sum_{k=1}^{p-1} [\lambda_0 + \lambda_1 \cdot (2\pi)^2 \cdot (k-p)^2] \cdot a_{p-1,k} \cdot a_{p-1,p-k}$$

and the following expression to the denominator:

$$-2 \sum_{k=0}^{p-1} [\lambda_0 + \lambda_1 \cdot (2\pi)^2 \cdot (k-p)^2] \cdot |a_{p-1,k}|^2$$

Since the multisegment version of Burg's method amounts only to replacing the terms $D_p$ and $G_p$ of the fractional expression of the reflection coefficient by the terms $D_{I,p}$ and $G_{I,p}$:

$$\mu_{I,p} = -\frac{D^*_{I,p}}{G_{I,p}}$$

with:

$$\begin{cases} D_{I,p} = \frac{2}{(N-p)I} \sum_{i=1}^{I} \sum_{n=p+1}^{N} \epsilon_{b,i,n-1,p-1} \cdot \epsilon^*_{f,i,n,p-1} \\ G_{I,p} = \frac{1}{(N-p)I} \sum_{i=1}^{I} \sum_{n=p+1}^{N} [|\epsilon_{f,i,n,p-1}|^2 + |\epsilon^*_{f,i,n,p-1}|^2] \end{cases}$$

it is deduced therefrom that the same regularization applied to the multisegment version of Burg's method leads to the adoption of a reflection coefficient having the form:

$$\mu_{I,p} = \frac{D^*_{I,p} + 2 \sum_{k=1}^{p-1} [\lambda_0 + \lambda_1 \cdot (2\pi)^2 \cdot (k-p)^2] \cdot a_{p-1,k} \cdot a_{p-1,p-k}}{G_{I,p} + 2 \sum_{k=0}^{p-1} [\lambda_0 + \lambda_1 \cdot (2\pi)^2 \cdot (k-p)^2] \cdot |a_{p-1,k}|^2}$$

The multisegment version of Burg's algorithm in the case of filtering can be made more robust with respect to the possible presence of one or more targets in the estimation window. indeed, the estimation of the mean autoregressive filter given by Burg's multisegment algorithm is "desensitized" since a target of high intensity of several lower intensities occupies a relative non-negligible number of cells of the estimation window. Since the mean filter is mismatched with the clutter environment, the detection of the target at output of the filtering is deteriorated or even absent.

To overcome this drawback, it is possible to develop a technique of statistical weighting of data elements coming from the cells as a function of a probability of a posteriori membership of these cells in the majority population, the mean autoregressive model of which is determined by the multisegment Burg algorithm. This technique leads to the following modification of the expression of the regularized multisegment reflection coefficient:

$$\mu_{I,p} = -\frac{D^*{}_{I,p} + 2 \cdot \sum_{k=1}^{p-1} [\lambda_0 + \lambda_1 \cdot (2\pi)^2 \cdot (k-p)^2] \cdot a_{p-1,k} \cdot a_{p-1,p-k}}{G_{I,p} + 2 \cdot \sum_{k=0}^{p-1} [\lambda_0 + \lambda_1 \cdot (2\pi)^2 \cdot (k-p)^2] \cdot |a_{p-1,k}|^2} \quad (30)$$

with $$\begin{cases} D_{I,p}' = 2 \cdot \sum_{i=1}^{I} K(\chi^2_{i,p-1}) \cdot \sum_{n=p+1}^{N} \epsilon_{b,i,n-1,p-1} \cdot \epsilon^*_{f,n,p-1} \\ G_{I,p}' = \sum_{i=1}^{I} K(\chi^2_{i,p-1}) \cdot \sum_{n=p+1}^{N} [|\epsilon_{f,i,n,p-1}|^2 + |\epsilon_{b,i,n-1,p-1}|^2] \end{cases}$$

In the above expression, the weighting $K(X_{i,p-1}^2)$ is expressed as follows:

$$K(\chi^2_{i,p-1}) = \frac{P(\chi^2_{i,p-1}/s_i=1) \cdot P(s_i=1)}{P(\chi^2_{i,p-1}/s_i=1) \cdot P(s_i=1) + P(\chi^2_{i,p-1}/s_i=0) \cdot P(s_i=0)}$$

$s_i$ being equal to 1 if the cell i of the estimation window contains only clutter and 0 if the cell i of the estimation window contains a target.

Furthermore, whatever the value of i, we have:

$$P(s_i=1)=p_1 \text{ et } P(s_i=0)=p_0$$

with $$(p_0+p_1)=1$$

$p_1$ being the a priori probability that a cell of the estimation window contains only clutter and $p_0$ being the a priori probability that a cell of the estimation window contains a target.

The variable $X_{i,p-1}^2$ depends on the variables of the p−1 order algorithm, either rough data elements if p=1 or forward and backward prediction errors. This variable follows a relationship of $X^2$.

The expression of the regularized statistically weighted multisegment reflection coefficient (30) is obtained by minimizing the following regularized energy:

$$E_p = U_p^{stat} + \sum_k \lambda_k \cdot R_{p,k}$$

where:

$$U_p^{stat} = E(P_p/\chi^2_{p-1}) = \sum_{j=1}^{I} (\chi^2_{j,p-1}) \cdot P_{j,p}$$

with $$P_{j,p} = \sum_{n=p+1}^{N} [|\epsilon_{f,j,n,p}|^2 + |\epsilon_{b,j,n,p}|^2]$$

and where, as seen here above:

$$R_{p,k} = \int_{-1/2}^{1/2} \left| \frac{d^k H_p(f)}{df^k} \right|^2 \cdot df$$

the minimizing consisting in cancelling the gradient of this regularized error energy term with reference to $\mu_{I,p}$.

$$\frac{\partial E_p}{\partial \mu_{I,p}} = 0 \rightarrow \mu_{I,p} \text{ optimum}$$

The expression of $U_p^{stat}$ represents the statistical expectation of the total energy (and no longer mean energy) of the forward and backward prediction errors of the majority population of the estimation window, conditional to the knowledge of the p−1 order variable $X_{p-1}^2 = (X_{1,p-1}^2, \ldots, X_{I,p-1}^2)$:

$$U_p^{stat} = E(P_p/X_{p-1}^2)$$

This expression is developed by applying the formula of the total probabilities:

$$E(P_p/\chi^2_{p-1}) = \sum_{i=1}^{2^I} P(C_i/\chi^2_{p-1}) \cdot E(P_p/C_i \cap \chi^2_{p-1})$$

$C_i \in C$ with $C = \{C/C_i = \{s_{i,k} = o_{i,k}\}_{k=1,\ldots,I} \text{ with } o_{i,k} = \{0,1\}\}$ $\begin{cases} s_{i,k} = 1 \text{ if the cell contains only clutter} \\ s_{i,k} = 0 \text{ if the cell contains a target and clutter} \end{cases}$ It is observed that $s_{i,k}$ corresponds to the cell k of the estimation window for the event $C_i$ and is shown that it is possible to reduce the operation to the following expression:

$$E(P_p/\chi^2_{p-1}) = \sum_{j=1}^{I} P(s_j = 1/\chi^2_{j,p-1}) \cdot P_{j,p}$$

Baye's relationship gives:

$$P(s_j=1/X_{j,p-1}^2)=K(X_{j,p-1}^2)$$

The formula of the new multisegment reflection coefficient given by the relationship (30) may be explained by developing the following considerations on the random variables conditioned by events:

Let us assume a partition of an event $C_i$ of a probabilized space E and a real random variable X. The formula of the total probabilities applied to the event $\{X<x\}$ gives:

$$F_X(x) = P(X<x) = \sum_{i=1}^{n} P(C_i) \cdot P(X<x/C_i) \quad (32)$$

$$f_X(x) = \sum_{i=1}^{n} P(C_i) \cdot f_{X/C_i}(x) \text{ with } f_{X/C_i}(x) = \frac{dP(X<x/C_i)}{dx}$$

$$E(X) = \int_{-\infty}^{\infty} x \cdot f_X(x) \cdot dx = \sum_{i=1}^{n} P(C_i) \int_{-\infty}^{\infty} x \cdot f_{X/C_i}(x) dx$$

-continued
$$E(X) = \sum_{i=1}^{n} P(C_i) \cdot E(X/C_i)$$

The last-named relationship can be used to compute the mean estimation error energy and deduce therefrom an expression of the multisegment reflection coefficient that possesses a statistical weighting of the data elements coming from each cell as a function of the probability that this cell belongs to the clutter environment.

To do this, the following notation is adopted:

$$C_i \in C \text{ with } C = \{C_i/C_i = \{s_{i,k} = o_{i,k}\}_{k=1,\ldots,I} \text{ with } o_{i,k} = \{0,1\}\}$$

$$\begin{cases} s_{i,k} = 1 \text{ if the cell contains only clutter} \\ s_{i,k} = 0 \text{ if the cell contains a target and clutter} \end{cases}$$

It can be seen that $\text{Card}[C] = 2^I$ and that $s_{i,k}$ corresponds to the cell k of the estimation window for the event $C_i$.

Then, it will be assumed that:

$$X = P_p$$

$P_p$ being the total forward and backward prediction error energy for the cells of the majority population in the estimation window $$X_{p-1}^2 = (X_{1,p-1}^2, \ldots, X_{I,p-1}^2)$$

with $$\chi_{i,p-1}^2 = \frac{\sum_{n=p+1}^{N} [|e_{f,i,n,p-1}|^2 + |e_{b,i,n-1,p-1}|^2]}{P_{i,p-1}}$$

Applying the formula (32) to $P_p$ on condition that $X_{p-1}^2$ is known, we get:

$$E(P_p/\chi_{p-1}^2) = \sum_{i=1}^{2^I} P(C_i/\chi_{p-1}^2) \cdot E(P_p/C_i \cap \chi_{p-1}^2) \quad (33)$$

for $$P(X/Z) = P\left[X \cap \left(\bigcup_{i=1}^{2^I} C_i\right)/Z\right]$$

$$= P\left[\bigcup_{i=1}^{2^I} (X \cap C_i)/Z\right]$$

$$= \sum_{i=1}^{2^I} P(X \cap C_i/Z) - P\left[\bigcap_{i=1}^{2^I} (X \cap C_i)/Z\right]$$

with $$\bigcap_{i=1}^{2^I} C_i = 0$$

$$\bigcup_{i=1}^{2^I} C_i = E$$

-continued
$$P\left[\bigcap_{i=1}^{2^I} (X \cap C_i)/Z\right] = P\left[X \cap \left(\bigcap_{i=1}^{2^I} C_i\right)/Z\right] = 0$$

Taking into account the fact that:

$$P(X \cap C_i/Z) = P(C_i \cap Z).$$

and replacing X by $P_p$ and Z by $X_{p-1}^2$ the operation is reduced, as with (32), to the expression (33).

For the rest of development, Bayes' formula will be applied to $P(C_i/X_{p-1}^2)$:

$$P(C_i/\chi_{p-1}^2) = \frac{P(\chi_{p-1}^2/C_i) \cdot P(C_i)}{P(\chi_{p-1}^2)} = \frac{P(\chi_{p-1}^2/C_i) \cdot P(C_i)}{\sum_{j=1}^{2^I} P(\chi_{p-1}^2/C_j) \cdot P(C_j)}$$

now $$\forall j, P(C_j) = \frac{1}{2^I}$$

so that $$P(C_i/\chi_{p-1}^2) = \frac{P(\chi_{p-1}^2/C_i)}{\sum_{j=1}^{2^I} P(\chi_{p-1}^2/C_j)}$$

To simplify the reading hereinafter, it will be taken that:

$$Q = \sum_{j=1}^{2^I} P(\chi_{p-1}^2/C_j)$$

It is possible to express as a synthetis: $E(P_p/C_i \cap X_{p-1}^2)$.

$$E(P_p/C_i \cap \chi_{p-1}^2) = E(P_p/C_i \cap \chi_{p-1}^2) = \sum_{j=1}^{I} \delta_{C(j)} \cdot P_{j,p}$$

with $$\delta_{C(j)} = \begin{cases} 1 \text{ if } s_{i,j} = 1 \text{ with } C_i = \{s_{i,k}\}_{k=1,\ldots,I} \\ 0 \text{ if not} \end{cases}$$

Namely, reducing the operation to the expression (33):

$$E(P_p/\chi_{p-1}^2) = \sum_{i=1}^{2^I} \left[\frac{P(\chi_{p-1}^2/C_i)}{Q} \cdot \sum_{j=1}^{I} \delta_{C(j)} \cdot P_{j,p}\right] \quad (34)$$

$$= \frac{1}{Q} \cdot \sum_{j=1}^{I} \left[\sum_{i=1}^{2^I} (P(\chi_{p-1}^2/C_i) \cdot \delta_{C(j)})\right] \cdot P_{j,p}$$

now $$\sum_{i=1}^{2^I} (P(\chi_{p-1}^2/C_i) \cdot \delta_{C(j)}) = \frac{P(\chi_{p-1}^2)}{2^I} \cdot \sum_{i=1}^{2^I} P(C_i/\chi_{p-1}^2) \cdot \delta_{C(j)}$$

for $$P(\chi_{p-1}^2/C_i) = \frac{P(\chi_{p-1}^2) \cdot P(C_i/\chi_{p-1}^2)}{P(C_i)} \quad et\, P(C_i) = 2^{-I}$$

now as $$P(G \cup H/K) = P(G/K) + P(H/K) - P(G \cap H/K)$$

and $$P\left(\bigcap_{i=1}^{2^I} C_i/\chi_{p-1}^2\right) = 0 \text{ for } \bigcap_{i=1}^{2^I} C_i = 0$$

then $$\sum_{i=1}^{2^I} P(C_i/\chi_{p-1}^2) \cdot \delta c_{(i)} = P\left(\bigcup_{i=1}^{2^I} [C_i \cdot \delta c_{(i)}]/\chi_{p-1}^2\right)$$

that is $$\sum_{i=1}^{2^I} P(\chi_{p-1}^2/C_i) \cdot \delta c_{(i)} = \frac{P(\chi_{p-1}^2)}{2^{-I}} \cdot P\left(\bigcup_{i=1}^{2^I} [C_i \cdot \delta c_{(i)}]/\chi_{p-1}^2\right)$$

now $$P\left(\bigcup_{i=1}^{2^I} [C_i \delta c_{(i)}]\right) = \sum_{i=1}^{2^I} P(C_i) \cdot \delta c_{(i)} = 2^{-I} \cdot 2^{I-1} = 2^{-1}$$

for $$P(C_i) = 2^{-I} \text{ et } \sum_{i=1}^{2^I} \delta c_{(i)} = 2^{I-1} \forall j$$

making it possible to write:

$$\sum_{i=1}^{2^I} (P(\chi_{p-1}^2/C_i) \cdot \delta c_{(i)}) = \frac{P(\chi_{p-1}^2) \cdot P\left(\bigcup_{i=1}^{2^I} [C_i \cdot \delta c_{(i)}]/\chi_{p-1}^2\right)}{2^{-(I-1)} \cdot P\left(\bigcup_{i=1}^{2^I} [C_i \cdot \delta c_{(i)}]\right)}$$

$$= 2^{I-1} \cdot P\left(\chi_{p-1}^2/\bigcup_{i=1}^{2^I} [C_i \cdot \delta c_{(i)}]\right)$$

Hereinafter, it will be preferred to write:

$$\sum_{i=1}^{2^I} (P(\chi_{p-1}^2/C_i) \cdot \delta c_{(i)}) = \frac{P(\chi_{p-1}^2) \cdot P\left(\bigcup_{i=1}^{2^I} [C_i \cdot \delta c_{(i)}]/\chi_{p-1}^2\right)}{2^{-I}}$$

On the basis of the expression (34), we come to the new expression:

$$E(P_p/\chi_{p-1}^2) = \frac{2^I \cdot P(\chi_{p-1}^2)}{Q} \cdot \sum_{j=1}^{J} \left[ P\left(\bigcup_{i=1}^{2^I} [C_i \cdot \delta c_{(i)}]/\chi_{p-1}^2\right) \cdot P_{j,p} \right] \quad (35)$$

now $$P\left(\bigcup_{i=1}^{2^I} [C_i \cdot \delta c_{(i)}]/\chi_{p-1}^2\right) =$$

$$P(s_j = 1/\chi_{1,p-1}^2, \ldots, \chi_{1,p-1}^2) = P(s_j = 1/\chi_{j,p-1}^2)$$

Here, $s_j$ is the reference given to the cell $j$ of the estimation window.

It has been seen here above that:

$$P(\chi_{p-1}^2) = \sum_{j=1}^{2^I} P(\chi_{p-1}^2/C_j) \cdot P(C_j) = 2^{-I} \cdot Q$$

This results in a new writing for the expression (35):

$$E(P_p/\chi_{p-1}^2) = \sum_{j=1}^{J} P(s_j = 1/\chi_{j,p-1}^2) \cdot P_{j,p} \quad (36)$$

with $$P(s_j = 1/\chi_{j,p-1}^2) = \frac{P(\chi_{j,p-1}^2/s_j = 1) \cdot P(s_j = 1)}{P(\chi_{j,p-1}^2)} =$$

$$\frac{P(\chi_{j,p-1}^2/s_j = 1) \cdot P(s_j = 1)}{P(\chi_{j,p-1}^2/s_j = 1) \cdot P(s_j = 1) + P(\chi_{j,p-1}^2/s_j = 0) \cdot P(s_j = 0)}$$

By derivation of (36) with respect to $\mu_{l,p}$, the expression of the reflection coefficient is found:

$$\frac{\partial E(P_p/\chi_{p-1}^2)}{\partial \mu_{l,p}} = 0 \rightarrow \mu_{l,p} = -\frac{D^*_{l,p}}{G_{l,p}} \quad (37)$$

with $$\begin{cases} D'_{l,p} = 2 \cdot \sum_{i=1}^{I} K(\chi_{i,p-1}^2) \cdot \sum_{n=p+1}^{N} \epsilon_{b,i,n-1,p-1} \cdot \epsilon^*_{f,n,p-1} \\ G'_{l,p} = \sum_{i=1}^{I} K(\chi_{i,p-1}^2) \cdot \sum_{n=p+1}^{N} [|\epsilon_{f,i,n,p-1}|^2 + |\epsilon_{b,i,n-1,p-1}|^2] \end{cases}$$

In the above expression $K(X_{i,p-1}^2)$ is given by:

$$K(\chi_{i,p-1}^2) = \frac{P(\chi_{i,p-1}^2/s_i = 1) \cdot P(s_i = 1)}{P(\chi_{i,p-1}^2/s_i = 1) \cdot P(s_i = 1) + P(\chi_{i,p-1}^2/s_i = 0) \cdot P(s_i = 0)}$$

$P(s_i=1)=p_1$ et $P(s_i=0)=p_0$ are a priori probabilities such that $p_0+p_1=1$.

For the case p=0, we have:

$$\begin{cases} P(\chi_{i,0}^2/s_i = 1) = \rho(\chi_{i,0,p}^2/s_i = 1) \cdot \Phi\rho(\chi_{i,0,p}^2/s_i = 1) \\ P(\chi_{i,0}^2/s_i = 0) = \rho(\chi_{i,0,p}^2/s_i = 0) \cdot \Phi\rho(\chi_{i,0,p}^2/s_i = 0) \end{cases}$$

with $$\begin{cases} \rho(\chi_{i,0,p}^2/.): \text{relationship of distribution in amplitude} \\ \Phi\rho(\chi_{i,0,p}^2/.): \text{relationship of distribution in phase} \end{cases}$$

For the cases ($s_i$=1) and (p=0), namely the case of clutter in the cell, for example chaff clutter, there is a log-normal relationship for the amplitude:

$$\rho(\chi_{i,0,p}^2/s_i = 1) = \frac{1}{2^{v/2} \cdot \Gamma(v/2)} \cdot e^{-\frac{\chi_{i,0,p}^2}{2}} \cdot (\chi_{i,0,p}^2)^{v/2-1}$$

with $\nu=N-2$: relationship of $X^2$ having $\nu$ degrees of liberty $$\chi^2_{i,0,p} = \sum_{n=1}^{N} \left( \frac{\log[|x_{n,i}|^2] - m_\rho}{\sigma_\rho} \right)^2$$

$$\begin{cases} \Gamma: \text{Euler function } \Gamma(z) = \int_0^\infty e^{-t} \cdot t^{z-1} \cdot dt \\ \Gamma(m + 1/2) = \frac{(2m)!}{2^{2m} \cdot m!} \cdot \sqrt{\pi} \quad \text{for } m \text{ as an integer} \end{cases}$$

for $m_\rho$ and $\rho_\rho$ defined by:

$$m_\rho = \frac{1}{N \cdot T} \cdot \sum_{i=1}^{I} \sum_{n=1}^{N} \log[|x_{n,i}|^2]$$

$$\sigma_\rho = \frac{1}{T \cdot (N-1)} \cdot \sum_{i=1}^{I} \sum_{n=1}^{N} (\log[|x_{n,i}|^2] - m_\rho)^2$$

and a Gaussian law in phase $$\Phi(\chi^2_{i,0,\Phi}/s_i = 1) = \frac{1}{2^{\nu/2} \cdot \Gamma(\nu/2)} \cdot e^{-\frac{\chi^2_{i,0,\Phi}}{2}} \cdot (\chi^2_{i,0,\Phi})^{\nu/2-1}$$

with $\nu=N-3$: relationship of $X^2$ having u degrees of liberty $$\chi^2_{i,0,\Phi} = \sum_{n=2}^{N} \left( \frac{\left[ \frac{1}{2 \cdot \pi} \cdot \arctan\left[ \frac{-Im(x_{n,i} \cdot x^*_{n-1,i})}{-Re(x_{n,i} \cdot x^*_{n-1,i})} \right] \right] - m_\Phi}{\sigma_\Phi} \right)^2_{\text{mod-}\pi}$$

$m_\Phi$ and $\sigma_\Phi$ being defined by:

$$m_\Phi = \frac{1}{N \cdot T} \sum_{i=1}^{I} \sum_{n=1}^{N} \left[ \frac{1}{2 \cdot \pi} \cdot \arctan\left[ \frac{-Im(x_{n,i} \cdot x^*_{n-1,i})}{-Re(x_{n,i} \cdot x^*_{n-1,i})} \right] \right]$$

$$\sigma_\Phi = \frac{1}{N \cdot I - I'} \sum_{i=1}^{I} \sum_{n=1}^{N} \left( \left[ \frac{1}{2 \cdot \pi} \cdot \arctan\left[ \frac{-Im(x_{n,i} \cdot x^*_{n-1,i})}{-Re(x_{n,i} \cdot x^*_{n-1,i})} \right] \right] - m_\Phi \right)^2_{\text{mod}\pi}$$

For the case ($s_i=1$) and ($p\neq 0$), namely the case of clutter in the cell, the statistical weighting of the cells is given by:

$$P(\chi^2_{i,p-1}/s_i=1) = \frac{1}{2^{\nu/2} \cdot \Gamma(\nu/2)} \cdot e^{-\frac{\chi^2_{i,p-1}}{2}} \cdot (\chi^2_{i,p-1})^{\nu/2-1}$$

with
$\nu=2.(N-p)$: relationship of $X^2$ with $\nu$ degees of liberty $$\chi^2_{i,p-1} = \frac{\sum_{n=p+1}^{N} [|\varepsilon_{f,i,n,p-1}|^2 + |\varepsilon_{b,i,n-1,p-1}|^2]}{P_{i,p-1}}$$

$$\begin{cases} P_{i,0} = \frac{1}{I} \sum_{i=1}^{I} P_{i,0} \\ P_{i,p-1} = [1 - |\mu_{i,p-1}|^2] \cdot P_{i,p-2} \end{cases}$$

For the case ($s_i=0$) and ($p=0$), namely the case of the target in the cell, the assumption taken is that the energy borne by each component of the signal follows a centered normal relationship of variance $\sigma_c^2$ (mean theoretical energy re-emitted by the target). The law of distribution of amplitude is then:

$$\rho(\chi^2_{i,0,\rho}/s_i=0) = \frac{1}{2^{\nu/2} \cdot \Gamma(\nu/2)} \cdot e^{-\frac{\chi^2_{i,0,\rho}}{2}} \cdot (\chi^2_{i,0,\rho})^{\nu/2-1}$$

with $\nu=N$: relationship of $x^2$ with $\nu$ degrees of liberty $$\chi^2_{i,0,\rho} = \frac{\sum_{n=1}^{N} |X_{n,i}|^2}{\sigma_c^2}$$

while the law of distribution in phase is Gaussian:

$$\Phi(\chi^2_{i,0,\Phi}/s_i=0) = \frac{1}{2^{\nu/2} \cdot \Gamma(\nu/2)} \cdot e^{-\frac{\chi^2_{i,0,\Phi}}{2}} \cdot (\chi^2_{i,0,\Phi})^{\nu/2-1}$$

with $\nu=N-3$: relationship of $X^2$ having u degrees of liberty $$\chi^2_{i,0,\Phi} = \sum_{n=2}^{N} \left( \frac{\left[ \frac{1}{2 \cdot \pi} \cdot \arctan\left[ \frac{-Im(x_{n,i} \cdot x^*_{n-1,i})}{-Re(x_{n,i} \cdot x^*_{n-1,i})} \right] \right] - m_\Phi}{\sigma_\Phi} \right)^2_{\text{mod-}\pi}$$

$m_\Phi$ and $\sigma_\Phi$ being defined by:

$$m_\Phi = \frac{1}{N} \sum_{n=1}^{N} \left[ \frac{1}{2 \cdot \pi} \cdot \arctan\left[ \frac{-Im(x_{n,i} \cdot x^*_{n-1,i})}{-Re(x_{n,i} \cdot x^*_{n-1,i})} \right] \right]$$

$$\sigma_\Phi = \frac{1}{N-1} \sum_{n=1}^{N} \left( \left[ \frac{1}{2 \cdot \pi} \cdot \arctan\left[ \frac{-Im(x_{n,i} \cdot x^*_{n-1,i})}{-Re(x_{n,i} \cdot x^*_{n-1,i})} \right] \right] - m_\Phi \right)^2_{\text{mod}\pi}$$

For the case ($s_i=1$) and ($p\neq 0$), namely the case of the target in the cell, the assumption taken is that the target is not the same, in terms of its Doppler spectrum, as with the clutter (if the contrary were the case, the cell would be likened to a cluttered cell which would then no longer involve penalties). In this case, the outputs of the filter at each p order possess the characteristics of the target that has not been filtered. $P(X_{i,p-1}^2/s_i=0)$ may then be broken down as for the case ($p=0$), into two relationships: a law of distribution in amplitude and a law of distribution in phase:

$$P(X_{i,p-1}^2/s_i=0) = \rho(X_{i,p-1,\rho}^2/s_i=0) \cdot \Phi(X_{i,p-1,\Phi}^2/s_i=0)$$

The law of distribution in amplitude is equal to:

$$\rho(\chi^2_{i,p-1,\rho}/s_i=1) = \frac{1}{2^{\nu/2} \cdot \Gamma(\nu/2)} \cdot e^{-\frac{\chi^2_{i,p-1}}{2}} \cdot (\chi^2_{i,p-1})^{\nu/2-1}$$

with
$\nu=2.(N-p)$: relationship of $X^2$ with $\nu$ degrees of liberty $$\chi^2_{i,p-1} = \frac{\sum_{n=p+1}^{N} [|\varepsilon_{f,i,n,p-1}|^2 + |\varepsilon_{b,i,n-1,p-1}|^2]}{\sigma_c^2}$$

The law of distribution in phase is Gaussian and is equal to:

$$\Phi(\chi^2_{i,p-1,\Phi}/s_i=0) = \frac{1}{2^{\nu/2} \cdot \Gamma(\nu/2)} \cdot e^{-\frac{\chi^2_{i,p-1,\Phi}}{2}} \cdot (\chi^2_{i,p-1,\Phi})^{\nu/2-1}$$

with:

$\nu=2 \cdot (N-p-1)-2$: relationship of the $x^2$ with $\nu$ degrees of liberty.

$$\chi^2_{i,p-1,\Phi} = \frac{\sum_{n=p+2}^{N} [\epsilon^2_{f,\Phi} + \epsilon^2_{b,\Phi}]}{\sigma_\Phi^2}$$

$\epsilon_{f,\Phi}$ and $\epsilon_{b,\Phi}$ being defined by:

$$\epsilon_{f,\Phi} = \frac{1}{2 \cdot \pi} \operatorname{acrtan}\left[ \frac{-Im(\epsilon_{f,i,n,p-1} \cdot \epsilon^*_{f,i,n-1,p-1})}{-Re(\epsilon_{f,i,n,p-1} \cdot \epsilon^*_{f,i,n-1,p-1})} \right] - m_\Phi;$$

$$\epsilon_{b,\Phi} = \frac{1}{2 \cdot \pi} \operatorname{acrtan}\left[ \frac{-Im(\epsilon_{b,i,n-1,p-1} \cdot \epsilon^*_{b,i,n-2,p-1})}{-Re(\epsilon_{b,i,n-1,p-1} \cdot \epsilon^*_{b,i,n-2,p-1})} \right] - m_\Phi$$

with $$m_\Phi = \frac{1}{2 \cdot N} \sum_{n=1}^{N} [\Phi_{\epsilon_f} + \Phi_{\epsilon_b}]$$

and $\sigma_\Phi$ being defined by:

$$\sigma_\Phi = \frac{1}{2N-1} \sum_{n=1}^{N} [(\Phi_{\epsilon_f} - m_\Phi)^2_{modn} + (\Phi_{\epsilon_b} - m_\Phi)^2_{modn}]$$

with:

$$\begin{cases} \Phi_{\epsilon_f} = \frac{1}{2\pi} \cdot \operatorname{acrtan}\left[ \frac{-Im(\epsilon_{f,i,n,p-1} \cdot \epsilon^*_{f,i,n-1,p-1})}{-Re(\epsilon_{f,i,n,p-1} \cdot \epsilon^*_{f,i,n-1,p-1})} \right] \\ \Phi_{\epsilon_b} = \frac{1}{2\pi} \cdot \operatorname{acrtan}\left[ \frac{-Im(\epsilon_{b,i,n-1,p-1} \cdot \epsilon^*_{b,i,n-2,p-1})}{-Re(\epsilon_{b,i,n-1,p-1} \cdot \epsilon^*_{b,i,n-2,p-1})} \right] \end{cases}$$

The expression of the weighted multisegment reflection coefficient (37) can be regularized:

$$E_p = U_p^{stat} + \sum_k \lambda_k \cdot R_{p,k} \quad (38)$$

with $$\begin{cases} U_p^{stat} = E(P_p/\chi^2_{p-1}) = \sum_{j=1}^{I} K(\chi^2_{j,p-1}) \cdot P_{j,p} \\ \text{with } P_{j,p} = \sum_{n=p+1}^{N} [|\epsilon_{f,j,n,p}|^2 + |\epsilon_{b,j,n,p}|^2] \\ K(\chi^2_{j,p-1}) = \frac{P(\chi^2_{j,p-1}/s_j=1) \cdot P(s_j=1)}{P(\chi^2_{j,p-1}/s_j=1) \cdot P(s_j=1) + P(\chi^2_{j,p-1}/s_j=0) \cdot P(s_j=0)} \\ R_{p,k} = \int_{-1/2}^{1/2} \left| \frac{d^k H_p(f)}{df^k} \right|^2 \cdot df \end{cases}$$

By derivation of the expression (38) with respect to $\mu_{i,p}$, the statistically weighted and regularized multisegment reflection coefficient is found:

$$\frac{\partial E_p}{\partial \mu_{i,p}} = 0$$

-continued $$\mu_{i,p} = \frac{D^*_{i,p} + 2 \cdot \sum_{k=1}^{p-1} [\lambda_0 + \lambda_1 \cdot (2\pi)^2 \cdot (k-p)^2] \cdot a_{p-1,k} \cdot a_{i,p-1,k}}{G'_{i,p} + 2 \cdot \sum_{k=1}^{p-1} [\lambda_0 + \lambda_1 \cdot (2\pi)^2 \cdot (k-p)^2] \cdot |a_{p-1,k}|^2}$$

with $$\begin{cases} D'_{i,p} = 2 \cdot \sum_{i=1}^{I} K(\chi^2_{i,p-1}) \cdot \sum_{n=p+1}^{N} \epsilon_{b,i,n-1,p-1} \cdot \epsilon^*_{f,n,p-1} \\ G'_{i,p} = \sum_{i=1}^{I} K(\chi^2_{i,p-1}) \cdot \sum_{n=p+1}^{N} [|\epsilon_{f,i,n,p-1}|^2 + |\epsilon_{b,i,n-1,p-1}|^2] \end{cases}$$

If this method of regularization of Burg's method is to be compared with Kitagawa's and Gersch's regularization method applied to the standard least error squares method, it can be observed, by resuming the reading of the relationship (4):

$$c_{k-l} = \sum_n x_{n-l} \cdot x^*_{n-k}$$

that we have:

$$D^*_p = 2 \sum_{l=0}^{p-1} \sum_{k=1}^{p} a_{p-1,l} \cdot a_{p-1,p-k} \cdot c_{k-l}$$

and:

$$G_p = 2 \sum_{l=0}^{p-1} \sum_{k=1}^{p-1} a_{p-1,l} \cdot a^*_{p-1,k} \cdot c_{k-l}$$

for:

$$\begin{cases} \epsilon_{f,n,p-1} = \sum_{k=0}^{p-1} a_{p-1,k} \cdot x_{n-k} \\ \epsilon_{b,n-1,p-1} = \sum_{k=0}^{p-1} a^*_{p-1,k} \cdot x_{n-p+k} \end{cases}$$

so that the reflection coefficient of Burg's regularized method defined in the relationship (29) can also be written as follows:

$$\mu_{i,p} = \frac{\sum_{l=0}^{p-1} \sum_{k=1}^{p} a_{p-1,l} \cdot a_{p-1,p-k} \cdot c_{k-l} + \sum_{k=1}^{p-1} [\lambda_0 + \lambda_1 \cdot (2\pi)^2 \cdot (k-p)^2] \cdot a_{p-1,k} \cdot a_{p-1,p-k}}{\sum_{l=0}^{p-1} \sum_{k=0}^{p-1} a_{p-1,l} \cdot a^*_{p-1,k} \cdot c_{k-l} + \sum_{k=0}^{p-1} [\lambda_0 + \lambda_1 \cdot (2\pi)^2 \cdot (k-p)^2] \cdot |a_{p-1,k}|^2}$$

or, by using Kronecker's symbols:

$$\mu_p = -\frac{\sum_{l=0}^{p-1} \sum_{k=1}^{p} a_{p-1,l} \cdot a_{p-1,p-k} \cdot (c_{k-l} + [\lambda_0 + \lambda_1 \cdot (2\pi)^2 \cdot (k-p)^2] \cdot \delta_{l,k})}{\sum_{l=0}^{p-1} \sum_{k=0}^{p-1} a_{p-1,l} \cdot a^*_{p-1,k} \cdot (c_{k-l} + [\lambda_0 + \lambda_1 \cdot (2\pi)^2 \cdot (k-p)^2] \cdot \delta_{l,k})}$$

This can also be written as:

$$\mu_p = -\frac{\sum_{l=0}^{p-1}\sum_{k=1}^{p} a_{p-1,l} \cdot a_{p-1,p-k} \cdot c'_{k-l}}{\sum_{l=0}^{p-1}\sum_{k=0}^{p-1} a_{p-1,l} \cdot a^*_{p-1,k} \cdot c'_{k-l}}$$

with:

$$\begin{cases} c'_{k-l} = c_{k-l} & \text{if } k \neq l \\ c'_{k-l} = c_{k-l} + [\lambda_0 + \lambda_1 \cdot (2\pi)^2 \cdot (k-p)^2] & \text{if } k = l \end{cases}$$

The terms of an implicit autocorrelation matrix are recognized in the terms $c'_{k-l}$:

$$\Omega'_p = \Omega_p + D^T D:$$

where $\Omega_p$ is the usual autocorrelation matrix of the samples of signals:

$$\Omega_p = \{c_{k-l}\}_{k,l \in (1,p)}$$

and D is the diagonal matrix:

$$D = \text{Diag}\{[\lambda_0 + \lambda_1 \cdot (2\pi)^2 \cdot p^2]^{\frac{1}{2}}, [\lambda_0 + \lambda_1 \cdot (2\pi)^2 \cdot (p-1)^2]^{\frac{1}{2}}, \ldots, [\lambda_0 + \lambda_1 \cdot (2\pi)^2]^{\frac{1}{2}}\}$$

This implicit autocorrelation matrix corresponds precisely to the explicit autocorrelation matrix of the method of autoregressive predictive model spectral analysis obtained by the regularized least errors square method developed by Kitagawa and Gersch.

This shows that the proposed new method for the regularization of Burg's maximum entropy method, provides a smoothing of the spectrum similar to that obtained with the Kitagawa's and Gersch's method of regularized least error squares while at the same time retaining the advantages related to Burg's maximum entropy method, namely the fact of having low computation costs and of being capable of being implanted in real time with a lattice structure, being extendable to the multisegment case introduced by Haykin in frequency filtering or temporal smoothing of spectral analysis and being robust with respect to computation noise, quantization errors and rounding-off operations.

Compared with the method of regularization of Burg's maximum entropy method by Silverstein and Pimbley's free energy minimization method, it can be shown that the regularization obtained with the new proposed method of regularization is better. Indeed, the method of regularization of Burg's maximum entropy method by the minimization of free energy brings into play only the residual energy of the prediction errors and therefore regularizes the solution comprehensively by preventing the denominator of the reflection coefficient from getting cancelled while the new method of regularization proposed places a direct constraint on the flattening of the spectrum.

To be certain of this, it may be recalled that the solution based on minimum free energy consists in making a search for the root, with a modulus smaller than 1, of the third degree equation with real coefficients in $\gamma_p$ of the relationship (10):

$$(1-\gamma_p^2) \cdot (\gamma_p \cdot G_p + |D_p|) = -2\alpha\gamma_p$$

$D_p$ and $G_p$ having their usual definitions of the relationships (10). This root can be put in the following form:

$$\gamma_p = -\frac{|D_p|}{G_p + \rho_\alpha} \quad \text{with } \rho_\alpha \in [0, \infty[$$

which gives a reflection coefficient having the form:

$$\mu_p = -\frac{D^*_p}{G_p + \rho_\alpha}$$

When p is close to the optimum order or is overestimated and when the prediction model becomes low or noisy, we have:

$$D^*_p = \frac{2}{N-p} \sum_{n=p+1}^{N} e^*_{b,n-1,p-1} \cdot e_{f,n,p-1} \xrightarrow[p \to p_{opt}]{} 0$$

and:

$$G_p = \frac{1}{N-p} \sum_{n=p+1}^{N} [|e_{f,n,p-1}|^2 + |e_{b,n-1,p-1}|^2] \xrightarrow[p \to p_{opt}]{} 2 \cdot \sigma^2$$

where $\sigma^2$ is a variance of white noise.

Now, for $\rho_\alpha = 0$, namely without regularization, the computation noises $b_c$ modify the ratio of $D_p^*$ and $G_p$ and therefore the reflection coefficient $\mu_p$:

$$\mu_p(+b_c) \xrightarrow[p \to p_{opt}]{} \frac{O_1(b_c)}{O_2(b_c)} \neq 0$$

and introduce spurious poles into the transfer function $H_p(z)$ of the associated predictive filter.

By contrast, in the case of the minimum free energy ($\rho_\alpha \neq 0$), $O_2(b_c)$ becomes negligible in relation to $\rho_\alpha$ and thus the reflection coefficient $\mu_p$ approaches zero in overcoming the pollution introduced by the computation noise. This prevents problems of singularity which induce spurious poles in the transfer function $H_p(z)$ of the associated predictive filter (spurious peaks in the spectrum).

It can then be noted that it is not necessary to resolve the third degree equation with real coefficients in $\gamma_p$:

$$(1-\gamma_p^2) \cdot (\gamma_p \cdot G_p + |D_p|) = -2\alpha\gamma_p$$

but that it is enough to find a $\rho_\alpha$ that is great enough such that:

$$\mu_p = -\frac{D^*_p}{G_p + \rho_\alpha}$$

is close to zero when p tends towards $p_{opt}$.

FIG. 1 shows a diagram of a computation circuit 1 for the computation of the complex coefficients $\{a_{p,0} \ldots a_{p,p}\}$ of a p order prediction model on the basis of the reflection coefficients $\{\mu_1, \ldots, \mu_p\}$, according to Burg's maximum entropy method which may or may not be regularized by the new method proposed. This computation circuit implements the relationship (12) of recurrence on the p order of the model:

$$a_{p,k} = a_{p-1,k} + \mu_p \cdot a^*_{p-1,p-k} \text{ with } k \in [1, \ldots, p-1] \quad (40)$$

* designating the conjugate operator with:

$$\begin{cases} a_{k,0} = 1 & \forall k \in [0, \ldots, p] \\ a_{p,p} = \mu_p \end{cases}$$

The first line which determines all the coefficients $a_{k,0}$ having an index zero of all the 0 to p order predictive models contains no operator since all the coefficients have a unit value.

The following lines which determine the coefficients $a_{p,k}$ having an index k varying from 1 to p−1 enclose a succession of conjugate operators (*), multipliers (×) and summators (Σ) implementing the recursive relationship (30).

For example, for the term $a_{2,1}$ the recursive relationship (40) gives the definition:

$$a_{2,1} = a_{1,1} + \mu_2 \cdot a_{1,1}^*$$

so that it is obtained by means of a two-input summator (Σ) receiving, at a first input, the term $a_{1,1}$, this term $a_{1,1}$ being none other than the reflection coefficient $\mu_1$ and, at a second input, the term $\mu_2 \cdot a_{1,1}^*$ delivered by a multiplier (×). This multiplier (×) receives firstly the term $\mu_2$ and secondly the conjugate term $a_{1,1}$ or the conjugate term $\mu_1$ delivered by means of a conjugate operator (*) interposed between the input of the term $\mu_1$ and the input of the multiplier (×).

For the term $a_{3,1}$ the recursive relationship (29) gives the definition:

$$a_{3,1} = a_{2,1} + \mu_3 \cdot a_{2,2}^*$$

which is obtained by means of a summator (Σ), a multiplier (×) and a conjugate operator (*) that are appropriately connected.

This is so up to the term $a_{p,p}$ which is taken to be equal to the reflection coefficient $\mu_p$.

Figure 2:
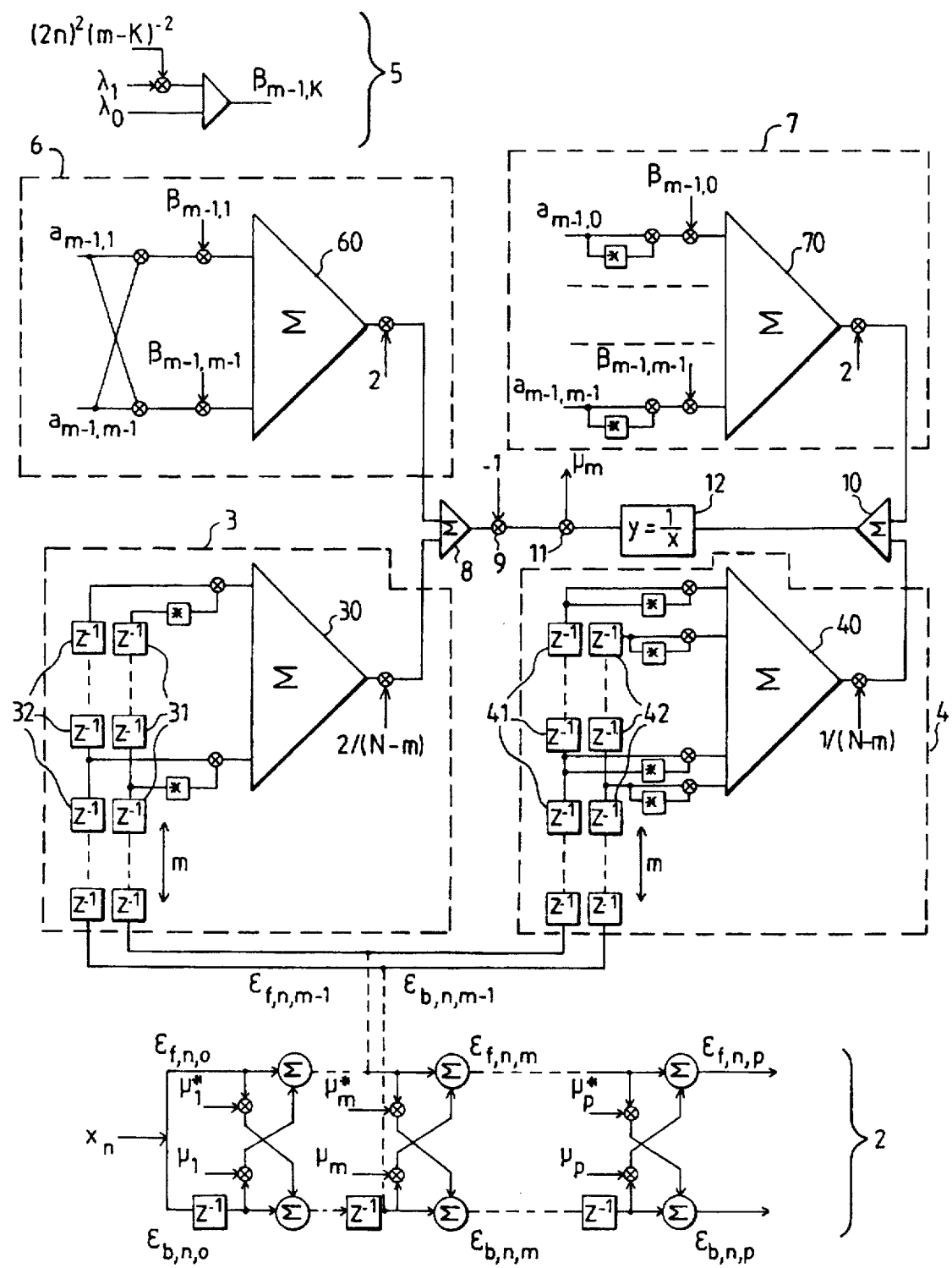
FIG. 2 shows a circuit for the computation by recurrence of the different reflection coefficients $\{\mu_1, \ldots, \mu_p\}$ on the basis of the different forward and backward prediction errors according to a Burg method regularized by the method according to the invention.

FIG. 2 shows the drawing of a circuit for the computation of a reflection coefficient $\mu_m$, with m varying from 1 to p, according to the new proposed method of regularization of Burg's maximum entropy method.

At the bottom of FIG. 2, there is a lattice filter 2 giving the forward and backward prediction errors $\epsilon_{f,n,m}$ and $\epsilon_{b,n,m}$, m varying from 1 to p, as a function of the value of the sample of the signal $x_n$. This lattice filter 2 implements the recursive relationships on the order which, in Burg's maximum entropy method, link the forward and backward prediction errors of a p order model to the forward and backward prediction errors of the immediately lower p−1 order model:

$$\begin{cases} \epsilon_{f,n,p} = \epsilon_{f,n,p-1} + \mu_p \cdot \epsilon_{b,n-1,p-1} \\ \epsilon_{b,n,p} = \epsilon_{b,n-1,p-1} + \mu_p^* \cdot \epsilon_{f,n,p-1} \end{cases}$$

with:

$$\epsilon_{f,n,0} = \epsilon_{b,n,0} = X_n$$

This lattice filter 2 has a sequence of p identical stages defining two parallel channels, one on which there are available the forward prediction errors $\epsilon_{f,n,m}$, with m varying from 1 to p, and the other on which there are available the backward prediction errors $\epsilon_{b,n-1,m}$, with m varying from 1 to p. Each stage has a two-input summator (Σ) on the forward prediction errors channel and a delay cell ($Z^{-1}$) on the backward prediction error channel. This delay cell delays the value of the error of a signal sample and is followed by a summator (Σ). Between these two channels, there are two multipliers (×) taking the crossed products. One is the multiplier of the forward prediction error available at input of the stage with the conjugate of the reflection coefficient $\mu_m^*$, m being the order of the stage, to apply it to the summator (Σ) of the backward prediction error channel. The other is the multiplier of the backward prediction error available at output of the delay cell of the stage with the reflection coefficient $\mu_m$, m being the order of the stage, to apply it to the summator (Σ) of the forward prediction error channel.

In addition to the lattice filter 2, there are circuits 3 and 4 for the computation of the terms $D_m^*$ and $G_m$, with m varying from 1 to p, of the numerator and the denominator of the fraction for the definition of the reflection coefficient $\mu_m$ of Burg's maximum entropy method:

$$\begin{cases} D_m^* = \dfrac{2}{N-m} \sum_{n=m+1}^{N} \epsilon_{b,n-1,p-1}^* \cdot \epsilon_{f,n,m-1} \\ G_m = \dfrac{1}{N-m} \sum_{n=m+1}^{N} [|\epsilon_{f,n,m-1}|^2 + |\epsilon_{b,n-1,m-1}|^2] \end{cases}$$

The circuit 3 for the computation of the term $D_m^*$ has a summator 30 with N−m inputs connected to the outputs of the N−m last stages of two N-stage shift registers 31 and 32 by means of multiplier circuits (×) and conjugate operators (*). The shift register 31 is connected to the inputs of the summator 30 by conjugate operators (*) and multiplier circuits (×). It is connected by its series input, at the lattice filter 2, to the output of the m−1$^{th}$ stage on the forward prediction error channel. The shift register 32 is connected to the inputs of the summator 30 solely by the multiplier circuits (×) and is connected by its series input, at the lattice filter 2, between the delay circuit ($Z^{-1}$) and the summator (Σ) of the m$^{th}$ stage, on the backward prediction error channel. A multiplier circuit (×) connected to the output of the summator 30 enables the application of a 2/(N−m) weighting after the summation to obtain the term $D_m^*$.

The circuit 4 for the computation of the term $G_m$ has a summator 40 with 2(N−m) inputs connected to the outputs of the N−m last stages of two N-stage shift registers 41 and 42 by means of individual circuits for the computation of the square formed by a multiplier circuit (×) with two inputs combined with a conjugate operator (*) interposed in one of the inputs. One of the shift registers 41 is connected by its series input, at the lattice filter 2, to the output of the m−1$^{the}$ stage on the channel of the forward prediction error while the other shift register 42 is connected by its series input, at the lattice filter 2, between the delay circuit ($Z^{-1}$) and the summator (Σ) of the m$^{th}$ stage on the backward prediction error channel. A multiplier circuit (×) connected at output of the summator 40 enables the application of a 1/(N−m) weighting after the summation to obtain the term $G_m$.

In addition to the computation circuits 1, 2, 3 and 4 which are in the devices for the real time implementation of the spectral analysis by the non-regularized Burg's maximum entropy method, there are specific computation circuits 5, 6 and 7 enabling the implementation of the new regularization method proposed.

The computation circuits 5 enable the computation of the intermediate parameters $\beta_{m-1,k}$ while the computation circuits 6 and 7 enable the computation of the corrective regularization terms to be applied to the numerator and denominator of the fraction defining the reflection coefficient $\mu_m$.

The computation circuits 5 enable the computation of the intermediate parameters:

$$\beta_{m-1,k} = \lambda_0 + \lambda_1 (2\pi)^2 \cdot (m-k)^2 \text{ with } k \in [1, \ldots, m-1]$$

They are each formed by a summator (Σ) with two inputs directly receiving the constant $\lambda_0$ at a first input and the constant $\lambda_1$ at a second input by means of a multiplier (×) taking the product of the constant $\lambda_1$ by the coefficient $(2\pi)^2 \cdot (m-k)^2$.

The computation circuit 6 enables the computation of the corrective term:

$$2 \cdot \sum_{k=1}^{m-1} \beta_{m-1,k} \cdot a_{m-1,m-k}$$

applied to the numerator of the quotient defining the reflection coefficient $\mu_m$. It consists of a summator 60 with m−1 inputs, the $k^{th}$ input receiving the coefficient $a_{m-1,k}$ by means of two multipliers (×) arranged in sequence, one taking a product by the coefficient $a_{m-1,m-k}$, the other taking the product by $\beta_{m-1,k}$. A multiplier (×) placed at output of the summator 60 enables the application of a weighting by 2 to arrive at the full expression of the corrective term of the numerator.

The computation circuit 7 enables the computation of the corrective term:

$$2 \cdot \sum_{k=0}^{m-1} \beta_{m-1,k} \cdot |a_{m-1,k}|^2$$

applied to the denominator of the quotient defining the reflection coefficient $\mu_m$. It consists of of a summator 70 with m−1 inputs, the $k^{th}$ input receiving the coefficient $a_{m-1,k}$ by means of an individual circuit for the computation of the square constituted by a multiplier circuit (×) with two inputs combined with a conjugate operator (*) interposed in one of its inputs. A multiplier (×) placed at output of the summator 70 enables the application of a weighting by 2 to arrive at the complete expression of the corrective term of the denominator.

The outputs of the computation circuits 3 and 6 at which there are available the term $D^*_m$ of the numerator of the quotient for defining the reflection quotient $\mu_m$ in Burg's maximum entropy method and the corrective term of this numerator for the regularization are connected to two inputs of a summator 8 fitted out at output with a multiplier circuit (×) 9 operating a multiplication by −1 to take account of the minus sign in the quotient for defining the reflection coefficient.

The outputs of the computation circuits 4 and 7 at which there are available the term $G_m$ of the denominator of the coefficient for defining the reflection coefficient $\mu_m$ in Burg's maximum entropy method and the corrective term of this denominator for the regularization are connected to the two inputs of a summator 10.

To obtain the reflection coefficient $\mu_m$, the regularized term of the numerator of its definition quotient, available at output of the multiplier circuit 9, is divided by the regularized term of the denominator of its definition quotient, available at output of the summator 10, by means of a two-input multiplier circuit 11, one of which is connected directly to the output of the multiplier circuit 9 while the other is connected to the output of the summator 10 by means of an inverter circuit 12.

Figure 3:
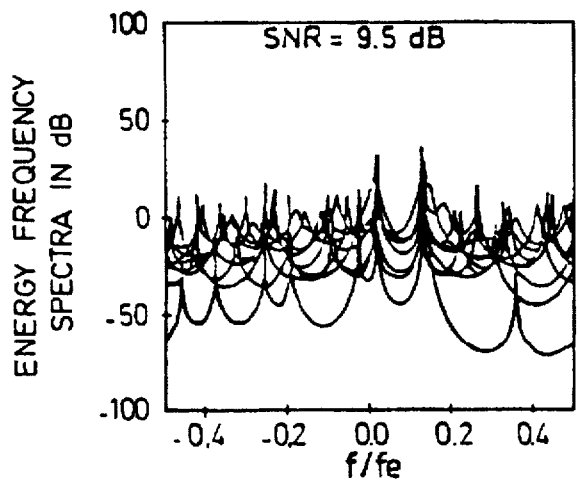
FIGS. 3, 4 and 5 show the different frequency spectra obtained by the Burg method respectively non-regularized and regularized by the minimum free energy method and regularized by the method according to the invention for a complex signal having two frequency lines on which, during ten random draws, ten evenly distributed samples have been drawn.
Figure 4:
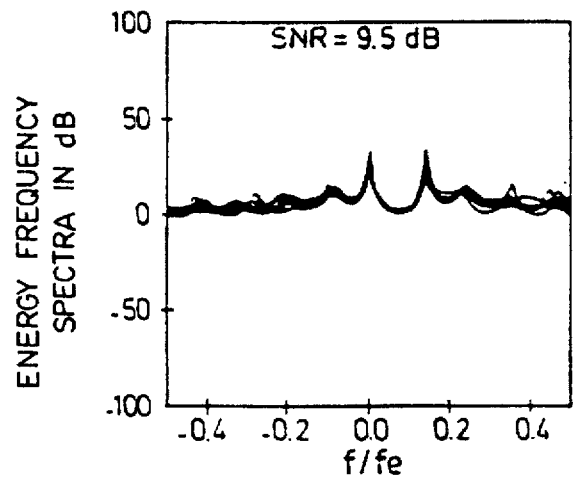
Figure 5:
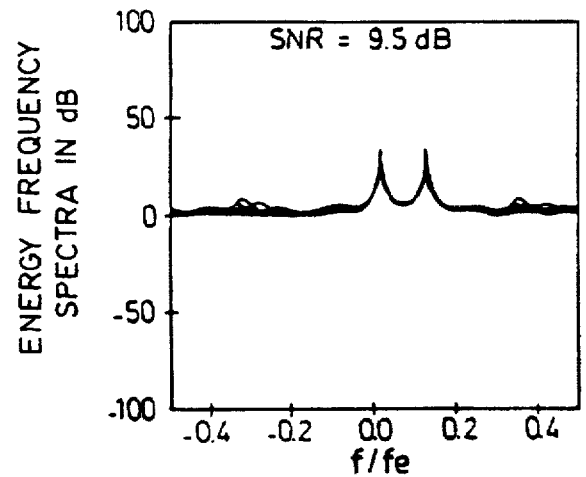

FIGS. 3, 4 and 5 show the different frequency spectra obtained by Burg's method respectively non-regularized and regularized by the free energy minimum method and regularized by the new method proposed, for a complex signal having two frequency lines from which, in the course of ten noise-infested draws, ten evenly distributed samples have been drawn.

FIG. 3, which depicts the spectra obtained for the ten noise-infested draws by implementing the non-regularized Burg's method up to the maximum possible order of nine (10−1), shows that the different versions of the spectrum obtained for the different drawings do not overlap except for the two frequency lines that actually exist and are affected by high amplitude spurious lines that differ according to the version. The result thereof is a mean spectrum that is far too noise-infested to be capable of being exploited.

FIG. 4, which shows the spectra obtained for the ten noise-infested drawing operations by implementing Burg's method up to the maximum possible order of nine, with a regularization by the minimum free energy method, taking account of a coefficient $\alpha$ equal to 1, shows that the different versions of the spectrum obtained for the different drawings always overlap for the two frequency lines that effectively exist and have spurious lines with far smaller amplitudes that tend to be superimposed. The resultant mean spectrum has become exploitable. However it is observed that the regularization has caused the loss of no small degree of amplitude in both of the really existing frequency lines.

FIG. 5 shows the spectra obtained for the ten noise-infested draws implementing the Burg method up to the maximum possible order of nine, with regularization according to the new method proposed, taking account of a coefficient $\lambda_0$ equal to 1 and a coefficient $\lambda_1$ equal to 0.001. This figure shows that the different spectra henceforth have only the two actually existing lines with minor ripples. With respect to the spectra of FIG. 4, it is noted that this new method of regularization has prompted a lower attenuation of the two actually existing frequency lines and a better attenuation of the spurious frequency lines. It is therefore more efficient.

What is claimed is:

1. A method for determining a frequency spectrum of a sampled signal $\{x_n\}$, comprising the steps of:

sensing the sampled signal $\{x_n\}$ with a sensor, said sampled signal $\{x_n\}$ being representative of an analog signal produced from a signal source;

assessing a coefficient $\{a_{p,k}\}$ of a p order prediction model that correspond to a law of prediction of an nth sample $x_n$ from n−p previous samples $\{x_{n-k}\}$, with k varying from 1 to p, having a form:

$$x_n = \epsilon_{f,n,p} - \sum_{k=1}^{p} a_{p,k} \cdot x_{n-k}$$

where $\epsilon_{f,n,p}$ is a forward prediction error, by the p order model, of the sample $x_n$ giving an estimation of the energy of the frequency spectrum of the signal sampled with said coefficients $\{a_{p,k}\}$, in a form:

$$|X(f)|^2 = \frac{P_p}{\left| \sum_{k=0}^{p} a_{p,k} \cdot e^{-j2\pi k f} \right|^2}$$

where $a_{p,0}$ is equal to 1 and where $P_p$ is an energy of a forward prediction error of the p order model for the sample $x_n$ when the model is reliable, namely when said error is a white noise, on the basis of a recursive law on the p order of the model having the form:

$$a_{p,k} = a_{p-1,k} + \mu_p \cdot a^*_{p-1,p-k}$$

* designating the conjugate operator, with:

$a_{p,0} = 1$ $a_{p-1,0} = 1$ $k \in [1, \ldots p-1]$ $\mu_p$ being a reflection coefficient determined from the terms:

$$\begin{cases} D_p = \frac{2}{N-p} \sum_{n=p+1}^{N} \epsilon_{b,n-1,p-1} \cdot \epsilon^*_{f,n,p-1} \\ G_p = \frac{1}{N-p} \sum_{n=p+1}^{N} [|\epsilon_{f,n,p-1}|^2 + |\epsilon_{b,n-1,p-1}|^2] \end{cases}$$

where $\epsilon_{f,b,p-1}$ designates the forward prediction error by the p−1 order prediction model on the sample $x_n$ and $\epsilon_{b,n-1,p-1}$ designates the backward prediction error by the p−1 order model on the sample $x_{n-p}$:

$$x_{n-p} = \epsilon_{b,n-1,p-1} - \sum_{k=1}^{p-1} a^*_{p-1,k} \cdot x_{n-p+k};$$

and determining the reflection coefficient $\mu_p$ by a relationship having a form:

$$\mu_p = \frac{D^*_p + 2 \sum_{k=1}^{p-1} [\lambda_0 + \lambda_1 \cdot (2\pi)^2 \cdot (k-p)^2] \cdot a_{p-1,k} \cdot a_{p-1,p-k}}{G_p + 2 \sum_{k=0}^{p-1} [\lambda_0 + \lambda_1 \cdot (2\pi)^2 \cdot (k-p)^2] \cdot |a_{p-1,k}|^2}$$

where $\lambda_0$ and $\lambda_1$ are positive real coefficients.

2. A method for determining the frequency spectrum of the mean of a family of 1 sampled signals $\{x_n\}_i$, comprising the steps of:

sensing the sampled signals sampled signals $\{x_n\}_i$ with a sensor, said sampled signals $\{x_n\}_i$ being representative of at least one analog signal produced from a signal source;

assessing a coefficients $\{a_{p,k}\}$ of a p order prediction model that correspond to a law of prediction of an nth sample $x_{i,n}$ based on n−p previous samples $\{x_{i,n-k}\}$, k varying from 1 to p, having a form:

$$x_{i,n} = \epsilon_{f,i,n,p} - \sum_{k=1}^{p} a_{p,k} \cdot x_{i,n-k} \quad i \in [1, \ldots, l]$$

where $\epsilon_{f,i,n,p}$ is a forward prediction error, by the p order model, of the sample $x_{i,n}$ of the signal i:

giving an estimation of a mean of respective energies of the frequency spectra of the sampled signals, with said coefficients $\{a_{p,k}\}$ in a form:

$$|X(f)|^2 = \frac{P_{I,p}}{\left| \sum_{k=0}^{p} a_{p,k} \cdot e^{-j2\pi k f} \right|^2}$$

where $a_{p,0}$ is equal to 1 and where $P_{I,p}$ is a mean of the energies of the forward prediction errors of the p order model for the nth samples $x_{i,n}$ of the 1 signals when the model is reliable, namely when said errors are white noises, based on a recursive law on the p order of the model having a form:

$$a_{p,k} = a_{p-1,k} + \mu_{I,p} \cdot a^*_{p-1,p-k}$$

* designating the conjugate form:
with:

$a_{p,0} = 1$ $a_{p-1,0} = 1$ $k \in [1, \ldots p-1]$ $\mu_p$ being a reflection coefficient determined on the basis of the terms:

$$\begin{cases} D_{I,p} = \frac{2}{(N-p)l} \sum_{i=1}^{l} \sum_{n=p+1}^{N} \epsilon_{b,n-1,p-1} \cdot \epsilon^*_{f,i,n,p-1} \\ G_{I,p} = \frac{1}{(N-p)l} \sum_{i=1}^{l} \sum_{n=p+1}^{N} [|\epsilon_{f,i,n,p-1}|^2 + |\epsilon_{b,i,n-1,p-1}|^2] \end{cases}$$

where $\epsilon_{f,n,p-1}$ designates the forward prediction error by the p−1 order prediction model on the nth sample of the $i^{th}$ signal and $\epsilon_{b,n-1,p-1}$ designates the backward prediction error, by the p−1 order model, on the n−p$^{th}$ sample of the $i^{th}$ signal:

$$x_{i,n-p} = \epsilon_{b,i,n-1,p-1} - \sum_{k=1}^{p-1} a^*_{p-1} \cdot x_{n-p+k};$$

and determining the reflection coefficient $\mu_p$ by a relationship having a form:

$$\mu_{I,p} = \frac{D^*_{I,p} + 2 \sum_{k=1}^{p-1} [\lambda_0 + \lambda_1 \cdot (2\pi)^2 \cdot (k-p)^2] \cdot a_{p-1,k} \cdot a_{p-1,p-k}}{G_{I,p} + 2 \sum_{k=0}^{p-1} [\lambda_0 + \lambda_1 \cdot (2\pi)^2 \cdot (k-p)^2] \cdot |a_{p-1,k}|^2}$$

where $\lambda_0$ and $\lambda_1$ are positive real coefficients.

3. A method for determining a frequency spectrum of the mean of a family of 1 sampled signals $\{x_n\}_i$, comprising the steps of:

sensing the family of 1 sampled signals $\{x_n\}_i$ with a sensor, said sampled signals $\{x_n\}_i$ being representative of analog signals produced from at least one signal source:

assessing a coefficients $\{a_{p,k}\}$ of a p order prediction model that correspond to a law of prediction of an nth sample $x_{i,n}$ based on n−p previous samples $\{x_{i,n-k}\}$, k varying from 1 to p, having the form:

$$x_{i,n} = \epsilon_{f,i,n,p} - \sum_{k=1}^{p} a_{p,k} \cdot x_{i,n-k} \quad i \in [1, \ldots, l]$$

where $\epsilon_{f,n,i,p}$ is a forward prediction error, by the p order model, of the sample $x_{i,n}$ of the signal i, giving an estimation of the mean of the energies of the frequency spectra of the sampled signals, with said coefficients $\{a_{p,k}\}$ in the form:

$$|X(f)|^2 = \frac{P_{I,p}}{\left| \sum_{k=0}^{p} a_{p,k} \cdot e^{-j2\pi k f} \right|^2}$$

where $a_{p,0}$ is equal to 1 and where $P_{I,p}$ is a mean of the energies of the forward prediction errors of the p order model for the nth samples $x_{i,n}$ of the 1 signals when the model is reliable, namely when said errors are white noises, based on a recursive law on the p order of the model having the form:

$$a_{p,k} = a_{p-1,k} + \mu_{I,p} \cdot a^*_{p-1,p-k}$$

* designating the conjugate operator: with:

$a_{p,0} = 1$ $a_{p-1,0} = 1$ $k \in [1, \ldots p-1]$ wherein the reflection coefficient $\mu_{l,p}$ is defined by the relationship:

$$\mu_{l,p} = \frac{D^*_{l,p} + 2 \cdot \sum_{k=1}^{p-1} [\lambda_0 + \lambda_1 \cdot (2\pi)^2 \cdot (k-p)^2] \cdot a_{p-1,k} \cdot a_{p-1,p-k}}{G_{l,p} + \sum_{k=0}^{p-1} [\lambda_0 + \lambda_1 \cdot (2\pi)^2 \cdot (k-p)^2] \cdot |a_{p-1,k}|^2}$$

with $$\begin{cases} D_{l,p} = 2 \cdot \sum_{i=1}^{I} K(X^2_{i,p-1}) \cdot \sum_{n=p+1}^{N} \epsilon_{b,i,n-1,p-1} \cdot \epsilon^*_{f,n,p-1} \\ G_{l,p} = \sum_{i=1}^{I} K(X^2_{i,p-1}) \cdot \sum_{n=p+1}^{N} [|\epsilon_{f,i,n,p-1}|^2 + |\epsilon_{b,i,n-1,p-1}|^2] \end{cases}$$

where the weighting $K(X_{i,p-1}^2)$ is expressed as follows:

$$K(X^2_{i,p-1}) = \frac{P(X^2_{i,p-1}/s_j = 1) \cdot P(s_i = 1)}{P(X_{i,p-1}2/s_j = 1) \cdot P(s_i = 1) + P(X^2_{i,p-1}/s_i = 0) \cdot P(s_i = 0)}$$

$s_i$ being equal to 1 if the cell i of the estimation window contains only clutter and 0 if the cell i of the estimation window contains a target, $P(s_i=1)$ being equal, irrespective of i, to an a priori probability $p_1$ that a cell of the estimation window contains only clutter, $P(s_i=0)$ being equal, irrespective of i, to an a priori probability that a cell of the estimation window contains a target, $p_1$ and $p_0$ being linked by the relationship:

$$P_0 + P_1 = 1$$

and the variable $X_{i,p-1}^2$ being equal to:

$$X^2_{i,p-1} = \frac{\sum_{n=p-1}^{N} [|\epsilon_{f,i,n,p-1}|^2 + |\epsilon_{b,i,n-1,p-1}|^2]}{P_{l,p-1}}$$

where $\epsilon_{f,i,n,p-1}$ designates the forward prediction error, by the p−1 order prediction model, on the nth sample of the $i^{th}$ signal, $\epsilon_{b,i,n-1,p-1}$ the backward prediction error, by the p−1 order model, on the n−pth sample of the $i^{th}$ signal:

$$x_{i,n-p} = \epsilon_{b,i,n-1,p-1} - \sum_{k=1}^{p-1} a^*_{p-1,k} \cdot x_{n-p+k}$$

and $P_{l,p-1}$ the mean of the energies of the p−1 order prediction errors.

4. A device to determine a frequency spectrum of a sampled signal $\{x_n\}$ comprising:
a sensor configured to sense the sampled signal, said sampled signal $\{x_n\}$ being representative of an analog signal produced from a signal source:
first computation means for assessing coefficients $\{a_{p,1}, \ldots, a_{p,p}\}$ of a p order prediction model that corresponds to a law of prediction of an nth sample $x_n$ from the n−p previous samples $\{x_{n-k}\}$, k varying from 1 to p, with a form:

$$x_n = \epsilon_{f,n,p} - \sum_{k=1}^{p} a_{p,k} \cdot x_{n-k}$$

where $\epsilon_{f,n,p}$ is a forward prediction error, by the p order model, of the sample $x_n$, said coefficient $\{a_{p,1}, \ldots, a_{p,p}\}$ giving an estimation of the energy of the frequency spectrum of the sampled signal in the form:

$$|X(f)|^2 = \frac{P_p}{\left| \sum_{k=0}^{p} a_{p,k} \cdot e^{-j2\pi kf} \right|^2}$$

where $a_{p,0}$ is equal to 1 and where $P_p$ is the energy of the forward prediction error of the p order model for the sample $x_n$ when the model is reliable, namely when said error is a white noise, on the basis of a recursive law on the p order of the model having the form:

$$a_{p,k} = a_{p-1,k} + \mu_p \cdot a^*_{p-1,p-k}$$

* designating the conjugate operator, with:

$a_{p,0} = 1$ $a_{p,0} = 1$ $k \in [1, \ldots p-1]$ $\mu_p$ being a reflection coefficient second computation means having a form of a lattice structure filter for determining forward prediction errors $\epsilon_{f,n,m}$ varying from 1 to p, and backward prediction errors $\epsilon_{b,n,m}$, with m varying from 1 to p, a backward prediction error $\epsilon_{b,n,m}$ being the backward prediction error, by the m order model, on a sample $x_{n-m}$:

$$x_{n-m} = \epsilon_{b,n-1,m-1} - \sum_{k=1}^{m-1} a^*_{m-1,k} \cdot x_{n-m+k}$$

said second computation means for determining the forward and backward prediction errors recursive relationships on the p order of the model:

$$\begin{cases} \epsilon_{f,n,m} = \epsilon_{f,n,m-1} + \mu_p \cdot \epsilon_{b,n-1,m-1} \\ \epsilon_{b,n,m} = \epsilon_{b,n-1,m-1} + \mu^*_p \cdot \epsilon_{f,n,m-1} \end{cases}$$

with:

$\epsilon_{f,n,0} = \epsilon_{b,n,0} = x_n$ third computation means for determining terms $D^*_m$, with m varying from 1 to p, based on the relationship on the forward and backward prediction errors:

$$D^*_m = \frac{2}{N-p} \sum_{n=m+1}^{N} \epsilon^*_{b,n-1,m-1} \cdot \epsilon_{f,n,m-1}$$

fourth computation means for determining terms $G_m$, with m varying from 1 to p, based on the relationship on the forward and backward prediction errors:

$$G_m = \frac{1}{N-p} \sum_{n=m+1}^{N} [|\epsilon_{f,n,m-1}|^2 + \epsilon_{b,n-1,m-1}|^2]$$

wherein said device further comprises:
fifth computation means for computing intermediate parameters $\beta_{m-1,k}$, with m varying from 1 to p and k varying from 1 to m−1, based on a definition:

$B_{m-1,k} = \lambda_0 + \lambda_1 (2\pi)^2 . m-k^2$ with $k \in [1, \ldots, m-1]$ $\lambda_0$ and $\lambda_1$ being positive real constants, sixth computation means for computing a first corrective term of regularization:

$$2 \cdot \sum_{k=1}^{m-1} B_{m-1,k} \cdot a_{m-1,k} \cdot a_{m-1,m-k}$$

to be applied to the value of the term $D^*_m$, computed by the third computation means, seventh computation means for computing a second corrective term of regularization:

$$2 \cdot \sum_{k=0}^{m-1} B_{m-1,k} \cdot |a_{m-1,k}|^2$$

to be applied to the value of the term $G_m$ computed by the fourth computation means, and eighth computation means for computing reflection coefficients $\mu_m$ based on the signals delivered by the third, fourth, sixth and seventh computation means by implementation of the relation:

$$\mu_m = \frac{D^*_m + 2\sum_{k=1}^{m-1}[\lambda_0 + \lambda_1 \cdot (2\pi)^2 \cdot (k-m)^2] \cdot a_{m-1,k} \cdot a_{m-1,m-k}}{G_m + 2\sum_{k=0}^{m-1}[\lambda_0 + \lambda_1 \cdot (2\pi)^2 \cdot (k-m)^2] \cdot |a_{m-1,k}|^2}$$

said reflexion coefficients $\mu_m$ being used by the first computation means to compute the coefficients $\{a_{p,1}, \ldots, a_{p,p}\}$ of the p order prediction model.

\* \* \* \* \*